United States Patent
Jeong et al.

(10) Patent No.: US 10,811,920 B2
(45) Date of Patent: *Oct. 20, 2020

(54) MOVING CORE-TYPE RECIPROCATING MOTOR AND RECIPROCATING COMPRESSOR HAVING THE SAME

(71) Applicant: LG ELECTRONICS INC., Seoul (KR)

(72) Inventors: Sangsub Jeong, Seoul (KR); Jaebeum Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 348 days.

This patent is subject to a terminal disclaimer.

(21) Appl. No.: 15/866,727

(22) Filed: Jan. 10, 2018

(65) Prior Publication Data

US 2018/0198337 A1  Jul. 12, 2018

(30) Foreign Application Priority Data

Jan. 10, 2017  (KR) .................. 10-2017-0003723

(51) Int. Cl.
*H02K 1/34* (2006.01)
*H02K 33/02* (2006.01)
(Continued)

(52) U.S. Cl.
CPC ............. *H02K 1/34* (2013.01); *F04B 35/045* (2013.01); *F04B 39/0016* (2013.01);
(Continued)

(58) Field of Classification Search
CPC .......... H02K 1/34; H02K 1/141; H02K 1/145; H02K 1/182; H02K 7/14; H02K 7/1807;
(Continued)

(56) References Cited

U.S. PATENT DOCUMENTS 6,089,836 A * 7/2000 Seo .................. F04B 39/0005
  417/417
6,097,125 A * 8/2000 Park .................. H02K 1/34
  310/12.16
(Continued)

FOREIGN PATENT DOCUMENTS

EP  1 912 319  4/2008
JP  H11-187638  7/1999
(Continued)

OTHER PUBLICATIONS

International Search Report dated Apr. 19, 2018 issued in Application PCT/KR2017/014967.
(Continued)

*Primary Examiner* — Maged M Almawri
(74) *Attorney, Agent, or Firm* — KED & Associates LLP

(57) ABSTRACT

Provided are a moving core-type reciprocating motor and a reciprocating compressor having the same. The moving core-type reciprocating motor includes a stator including an inner stator and an outer stator having one side connected to one side of the inner stator and the other side spaced apart from the other side of the inner stator in a radius direction to define a gap together with the other side of the inner stator, a magnet coil wound between the inner stator and the outer stator, a magnet fixed to at least one of the inner stator and the outer stator so as to be exposed to the gap, a rotor including a moving core disposed in the gas and made of a magnetic material to reciprocate with respect to the stator and the magnet and a hollow connection member made of a nonmagnetic material and supporting the moving core so that the moving core is exposed to the gap toward the magnet. Thus, the reciprocating motor and the reciprocating compressor having the same are compact and lightweight to more improve efficiency.

22 Claims, 27 Drawing Sheets

(51) Int. Cl.
*F04B 53/12* (2006.01)
*H02K 1/18* (2006.01)
*F04B 53/16* (2006.01)
*F04B 39/00* (2006.01)
*H02K 1/14* (2006.01)
*H02K 33/16* (2006.01)
*F04B 35/04* (2006.01)
*H02K 7/14* (2006.01)
*H02K 33/00* (2006.01)

(52) U.S. Cl.
CPC ........ *F04B 39/0061* (2013.01); *F04B 53/125* (2013.01); *F04B 53/16* (2013.01); *H02K 1/141* (2013.01); *H02K 1/145* (2013.01); *H02K 1/182* (2013.01); *H02K 7/14* (2013.01); *H02K 33/00* (2013.01); *H02K 33/02* (2013.01); *H02K 33/16* (2013.01)

(58) Field of Classification Search
CPC .... H02K 7/1815; H02K 7/1876; H02K 33/00; H02K 33/02; H02K 33/16; H02K 16/00; H02K 16/04; H02K 35/00; F04B 35/045; F04B 39/0016; F04B 39/0061; F04B 53/125; F04B 53/16
USPC ......... 310/15, 23, 24, 25, 12.01, 12.15, 266; 417/417
See application file for complete search history.

(56) References Cited

U.S. PATENT DOCUMENTS

| | | | | |
|---|---|---|---|---|
| 6,174,141 | B1* | 1/2001 | Song | F04B 35/045 417/312 |
| 7,381,033 | B2* | 6/2008 | Lee | F04B 35/045 310/15 |
| 7,382,067 | B2* | 6/2008 | Nakagawa | H01F 7/1615 310/15 |
| 7,626,289 | B2* | 12/2009 | Her | F04B 35/045 310/12.04 |
| 7,649,285 | B2* | 1/2010 | Ueda | F25B 9/14 310/12.01 |
| 7,748,963 | B2* | 7/2010 | Lee | F04B 39/0284 417/415 |
| 9,531,222 | B2* | 12/2016 | Uchitani | H02K 1/148 |
| 9,677,553 | B2* | 6/2017 | Jeong | H02K 33/16 |
| 9,714,648 | B2* | 7/2017 | Kim | F04B 39/0027 |
| 2003/0080634 | A1* | 5/2003 | Kwon | H02K 1/34 310/15 |
| 2003/0102763 | A1* | 6/2003 | Park | H02K 33/16 310/15 |
| 2003/0110615 | A1* | 6/2003 | Ku | H02K 1/278 29/596 |
| 2003/0147759 | A1* | 8/2003 | Chang | F04B 35/045 417/417 |
| 2004/0061583 | A1 | 4/2004 | Yumita | |
| 2004/0145248 | A1* | 7/2004 | Jung | H02K 1/27 310/15 |
| 2004/0247457 | A1* | 12/2004 | Kim | F04B 35/045 417/312 |
| 2005/0023905 | A1 | 2/2005 | Sakamoto | |
| 2005/0057101 | A1* | 3/2005 | Nakagawa | H01F 7/1615 310/12.24 |
| 2005/0104456 | A1 | 5/2005 | Yajima et al. | |
| 2005/0140218 | A1 | 6/2005 | Song et al. | |
| 2007/0009370 | A1* | 1/2007 | Kim | F04B 35/045 417/417 |
| 2011/0135518 | A1* | 6/2011 | Kang | F04B 35/045 417/417 |
| 2013/0058811 | A1* | 3/2013 | Hong | F04B 35/045 417/417 |
| 2014/0346918 | A1* | 11/2014 | Uchitani | H02K 1/148 310/208 |
| 2015/0004026 | A1* | 1/2015 | Jeong | F04B 35/045 417/415 |
| 2016/0276916 | A1* | 9/2016 | Singh | H02K 35/02 |
| 2017/0366078 | A1* | 12/2017 | Zhang | H02K 41/02 |
| 2017/0370354 | A1* | 12/2017 | Jeong | F04B 35/04 |

FOREIGN PATENT DOCUMENTS

| | | |
|---|---|---|
| JP | 2000-083364 | 3/2000 |
| JP | 2000-116100 | 4/2000 |
| JP | 2002-010610 | 1/2002 |
| JP | 2002-034225 | 1/2002 |
| JP | 2003-134787 | 5/2003 |
| JP | 2003-250256 | 9/2003 |
| JP | 2006-034057 | 2/2006 |
| JP | 2012-023794 | 2/2012 |
| KR | 10-0492612 | 5/2005 |
| KR | 10-0539813 | 12/2005 |
| WO | WO 02/093719 | 11/2002 |
| WO | WO 2012/119302 | 9/2012 |
| WO | WO 2013/042341 | 3/2013 |

OTHER PUBLICATIONS

International Search Report dated May 18, 2018 issued Application PCT/KR2018/000377.
European Search Report dated May 18, 2018 issued in Application EP 18 15 0600.
Partial European Search Report dated May 24, 2018 issued in Application EP 18 15 0923.

* cited by examiner

MOVING CORE-TYPE RECIPROCATING MOTOR AND RECIPROCATING COMPRESSOR HAVING THE SAME

CROSS-REFERENCE TO RELATED APPLICATION

This application claims priority under 35 U.S.C. § 119 to Korean Application No. 10-2017-0003723 filed on Jan. 10, 2017, whose entire disclosure(s) is/are hereby incorporated by reference.

BACKGROUND

1. Field

The present disclosure relates to a moving core-type reciprocating motor and a reciprocating compressor having the same.

2. Background

Motors are apparatuses that convert electric energy into mechanical energy to obtain rotation force or reciprocating power. Such a motor may be divided into an AC motor and a DC motor according to power applied to the motor.

The motor includes a stator and a mover or rotor. The rotor provided with a magnet rotates or reciprocates according to a direction of a flux generated when current flows through a coil provided in the stator.

The motor may be divided into a rotary motor or a reciprocating motor according to a mode of motion of the rotor. In the rotary motor, a flux is generated in the stator by power applied to the magnetic coil, and the rotor rotates with respect to the stator by the flux. On the other hand, in the reciprocating motor, the rotor linearly reciprocates with respect to the stator.

The reciprocating motor is a kind of motor in which a planar rotor is placed on a top surface of a planar stator to linearly move according to a change in magnetic fields of the stator so that the flux of the motor, which a general solid structure, is deformed into a planar flux.

In recent years, introduced is a reciprocating motor for a compressor, in which a stator has a cylindrical shape including an inner stator and an outer stator, a magnet coil for generating induced magnetization is wound around one of the inner stator and the outer stator, and a magnet in which magnet poles are arranged in an axial direction of the stator is provided in the rotor to allow the rotor to reciprocate in an air gap between the inner stator and the outer stator.

The reciprocating motor for the compressor is disclosed in Korean Patent Registration No. 10-0492612 (hereinafter, referred to as a prior art 1) and Korean Patent Registration No. 10-0539813 (hereinafter, referred to as a prior art 2).

In the prior art 1 and the prior art 2, a plurality of iron cores, each of which is provided as a thin plate, are radially stacked on a magnetic coil having an annular shape to form an outer stator or an inner stator.

The reciprocating motor as described above includes a mechanical resonance spring, which is provided as a compression coil spring, on each of both sides in a reciprocating direction of the rotor so that the rotor stably reciprocates.

Thus, when the rotor moves in a front and rear direction along a flux direction of the power applied to the magnetic coil, the mechanical resonance spring disposed in the moving direction of the rotor may accumulate repulsive force while being compressed, and when the rotor moves in an opposite direction, the mechanical resonance spring in which the repulsive force is accumulated may push the rotor. Here, a series of this process is repeated.

However, in the above-described reciprocating motor according to the related art, although the rotor is supported by the mechanical resonance spring that is provided as the compression coil spring, since the compression coil spring is resonant by oneself due to its characteristics, a driving frequency in a specific section even within a driving frequency in a certain section is not used as the driving frequency.

Also, in the reciprocating motor according to the related art, since the mechanical resonance spring that is provided as the compression coil spring is installed, a mechanical stress limit and a vibration distance limit occur due to the characteristics of the compression coil spring, and thus, since the resonance spring has to secure a predetermined wire diameter and a length of the spring, a decrease in transverse length of the reciprocating motor may be limited.

Also, in the reciprocating motor according to the related art, since the mechanical resonance spring that is provided as the compression coil spring is installed, a spring support member for fixing both ends of the compression coil spring has to be provided on each of the rotor and the stator. Thus, the motor may be complicated in mechanical structure, and the plurality of resonance springs have to be installed on each of front and rear portions of the rotor by pressing the resonance springs at a high pressure. As a result, it may be difficult to perform an assembly process.

Also, in the reciprocating motor according to the related art, since the rotor including the magnet is disposed to reciprocate between the outer stator and the inner stator, a gap may be generated in each of the outside and the inside with respect to the rotor to increase the total gap, thereby deteriorating motor efficiency.

Also, in the reciprocating motor according to the related art, the magnet and a magnet frame supporting the magnet may increase in thickness to increase in total weight of the rotor. As a result, power consumption may increase, and also, the gap between the outer stator and the inner stator may increase to more deteriorate the motor efficiency.

Also, as described above, in the reciprocating motor according to the related art, since the magnet is provided in the rotor, the magnet and the magnet frame have to be surrounded by a nonmagnetic and nonconductive material such as a fiber and a resin to form a coating layer so that the magnet is not separated from the magnet frame while the rotor reciprocates. Thus, the magnetic gap may increase by a thickness of the coating layer, and thus, the motor efficiency may be more deteriorated by a size of the increasing magnetic gap.

Also, the reciprocating compressor to which the above-described reciprocating motor is applied still has the above-described limitations in the reciprocating motor and thus has a limitation in miniaturizing the reciprocating compressor.

BRIEF DESCRIPTION OF THE DRAWINGS

The embodiments will be described in detail with reference to the following drawings in which like reference numerals refer to like elements wherein.

DETAILED DESCRIPTION

Hereinafter, exemplary embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

The drawings attached to the following embodiments are embodiments of the scope of the invention, but to facilitate understanding within the scope of the present invention, in the description of the fine portions, the drawings may be expressed differently according to the drawings, and the specific portions may not be displayed according to the drawings, or may be exaggerated according to the drawings.

Figure 1:
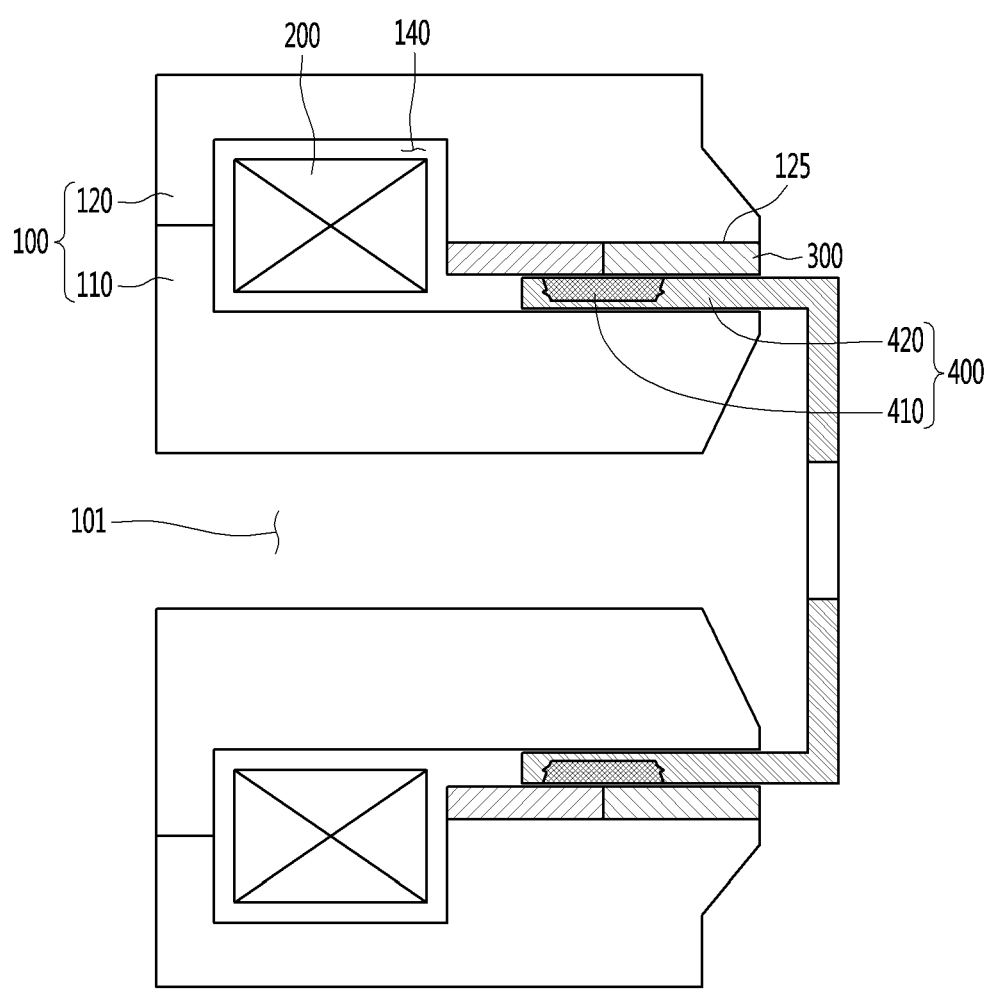
FIG. 1 is a schematic cross-sectional view of a moving core-type reciprocating motor according to an embodiment.
Figure 2:
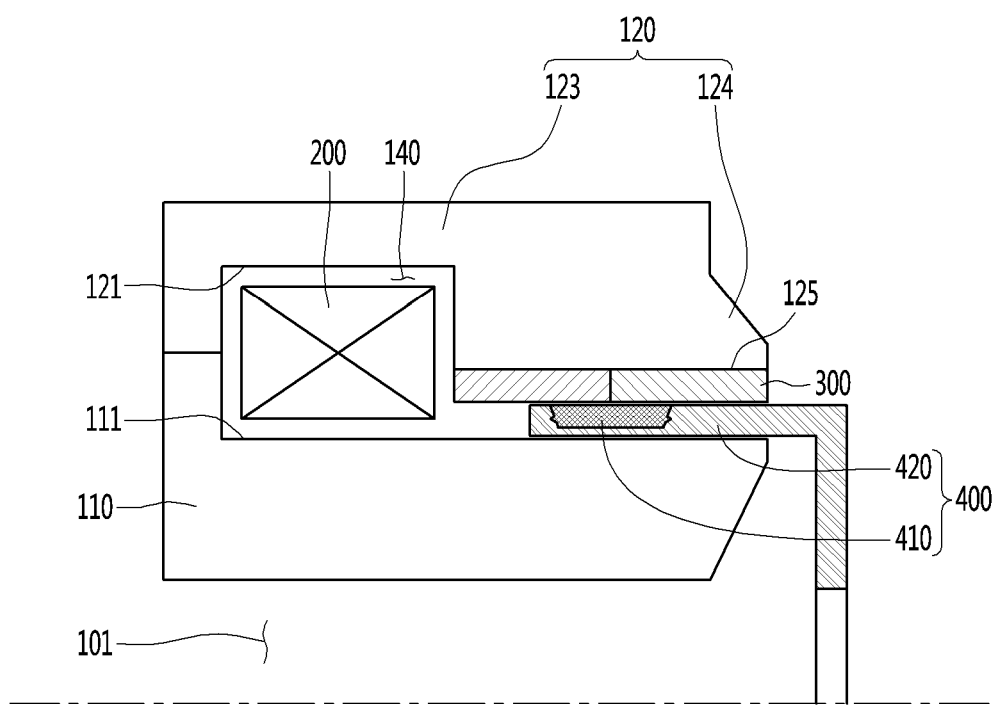
FIG. 2 is a cross-sectional view illustrating a portion of a state and a rotor of FIG. 1.
Figure 3:
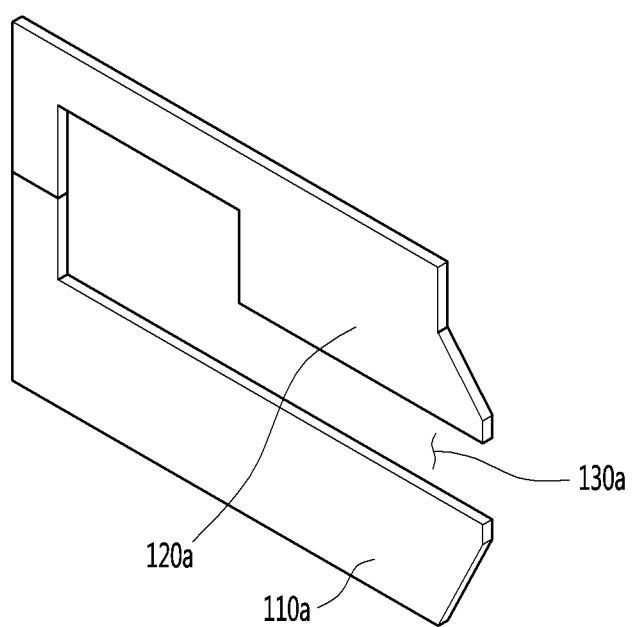
FIG. 3 is a perspective view of a core block constituting the stator that is one of components according to an embodiment.

FIG. 1 is a schematic cross-sectional view of a moving core-type reciprocating motor according to an embodiment, FIG. 2 is a cross-sectional view illustrating a portion of a state and a rotor of FIG. 1, and FIG. 3 is a perspective view of a core block constituting the stator that is one of components according to an embodiment.

Referring to FIGS. 1 and 2, a moving core-type reciprocating motor according to an embodiment may include a stator 100, a magnet coil 200, a magnet 300, and a rotor 400.

The stator 100 includes an inner stator 110 and an outer stator 120 having one side connected to the inner stator 110 and the other side that is spaced apart from the other side of the inner stator 110 in a radius direction to define a gap 130 together with the other side of the inner stator 110.

Here, each of the inner stator 110 and the outer stator 120 constituting the stator 100 may be made of a magnetic or conductive material.

Also, in this embodiment, the inner stator 110 may be formed by radially stacking an inner core block 110a, and the outer stator 120 may be formed by radially stacking an outer core block 120a.

Here, as illustrated in FIG. 3, each of the inner core block 110a and the outer core block 120a may have a thin fin shape so that one side of the inner core block 110a and one side of the outer core block 120a are connected to each other, and the other sides thereof are spaced apart from each other to define a gap 130a.

When the inner core block 110a and the outer core block 120a are radially stacked as described above, the inner stator 110 and the outer stator 120 may have a circular shape when viewed in an axial direction and also have a cylindrical shape on the whole. In this case, the gap 130 the gap 130 defined between the inner stator 110 and the outer stator 120 may also have a cylindrical shape on the whole.

In this embodiment, at least one of the inner core block 110a and the outer core block 120a may have a "-" shape, a "¬" shape, or a "⊏" shape and also may have various shapes.

For example, the inner core block 110a and the outer core block 120a, which are connected to be integrated with each other, may generally have the "⊏" shape.

The magnet coil 200 may be wound between the inner stator 110 and the outer stator 120, or the wound magnet coil 200 may be accommodated between the inner stator 110 and the outer stator 120.

In this embodiment, the magnet coil 200 may be wound around the inner stator 110 and thus connected to the inner stator 110. Alternatively, the magnet coil 200 may be separately wound and then be fixed between the inner stator 110 and the outer stator 120.

In the former case, the magnet coil 200 may be wound around the inner stator 110, and then, the outer stator 120 may be fixed to the inner stator 110. In the latter case, the inner stator 110 may be manufactured by radially stacking the plurality of inner core blocks 110a on an inner circumferential surface of the magnet coil 200 that is in the wound state, and the outer stator 120 may also be manufactured by radially stacking the plurality of outer core blocks 120a on an outer circumferential surface of the magnet coil 200 that is in the wound state.

Here, as described above, the inner stator 110 may have a hollow 101 by the inner core blocks 110a that are radially stacked. The hollow 101 may be utilized as a space in which a piston and a cylinder, which will be described later, are disposed.

For another example, the inner core block 110a and the outer core block 120a may be integrated with each other to form the "n" shape and then stacked in a manner in which the integrated inner and outer core blocks 110a and 120a are inserted into the magnet coil 200. Also, the inner core block 110a may be radially stacked on the inner circumferential surface of the magnet coil 200, and then, the outer core block 120a may be radially stacked on the outer circumferential surface of the magnet coil 200. In the latter case, while the outer core block 120a is disposed on the outer circumferential surface of the magnet coil 200, a process in which one side of the inner core block 110a and one side of the outer core block 120a are connected to be integrated with each other may be performed at the same time.

Referring again to FIG. 2, the magnet coil 200 may be accommodated between the inner stator 110 and the outer stator 120 to define a space part 140 communicating with the gap 130.

Furthermore, winding grooves 111 and 121 that are recessed inward so that the space part 140 is defined in faces facing each other may be defined in at least one of the inner stator 110 and the outer stator 120.

Here, the space part 140 or the winding grooves 111 and 121 may have a size that is proportional to an amount of wound magnet coil 200.

For example, as illustrated in FIGS. 1 to 5, the winding grooves 111 and 121 may be defined in both the inner and outer stators 110 and 120.

Figure 6:
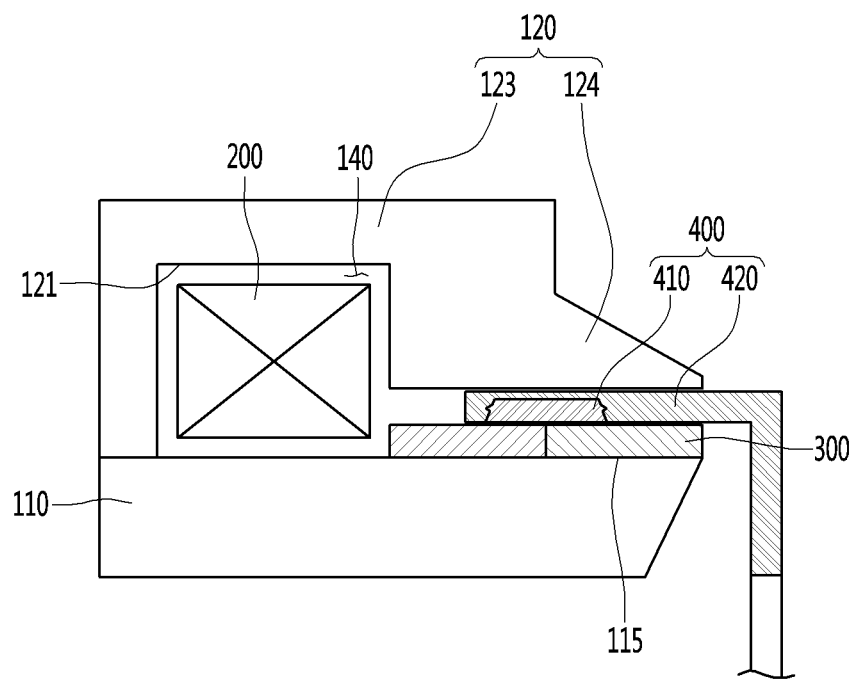
FIG. 6 is a schematic cross-sectional view of a moving core-type reciprocating motor according to another embodiment.

For another example, as illustrated in FIG. 6, the winding groove may not be defined in the inner stator 110, and but be defined in only the outer stator 120.

Although not shown, for another example, the winding groove may not be defined in the outer stator 120, but be defined in only the inner stator 110.

As described above, when the winding grooves 111 and 121 are defined, the space part 140 in which the magnet coil 200 is accommodated may be provided to more easily connect the magnet coil 200 to the inner and outer stators 110 and 120. Also, a yoke part 123 having a relatively thinner thickness than that of a pole part 124 to which the magnet 300 is fixed may be disposed on the inner stator 110 and the outer stator 120 by the winding groove 121.

As described above, the yoke part 123 providing a magnetic path and the pole part 124 which is expanded to be greater than a width of the yoke part 123 and to which the magnet 300 is fixed may be disposed on at least one of the inner stator 110 or the outer stator 120.

Here, the pole part 124 may have the same length as the magnet 300 or a length slightly greater than that of the magnet 300 fixed thereto.

As described above, magnetic spring stiffness, an alpha value (a force constant of the motor), a variation of the alpha value, and the like may be defined by combination of the yoke part 123 and the pole part 124. The yoke part 123 and the pole part 124 may be defined in length or shape within various ranges according to a design of a product to which the corresponding reciprocating motor is applied.

As described above, the magnet 300 may be fixed to at least one portion of the outer circumferential surface of the inner stator 110 and the inner circumferential surface of the outer stator 120, which are respectively stacked in the cylindrical shape on the inner and outer circumferential surfaces of the magnet coil 200.

Here, the magnet 300 may be disposed to be spaced apart from the magnet coil 200 in the reciprocating direction of the rotor 400 that will be described later. That is, the magnet 300 and the magnet coil 200 may be disposed so that the magnet 300 and the magnet coil 200 do not overlap each other in the radius direction of the stator 100.

According to the related art, the magnet 300 and the magnet coil 200 may not overlap each other in the radius direction of the stator 100, and thus, the motor may increase in diameter. On the other hand, according to an embodiment, the magnet 300 and the magnet coil 200 may be disposed to be spaced apart from each other in the reciprocating direction of the rotor 400 to reduce the diameter of the motor when compared to that of the motor according to the related art.

Also, different magnetic poles of the magnet 300 may be arranged in the reciprocating direction of the rotor 400.

For example, the magnet 300 may be provided as a 2-pole magnet of which an N pole and an S pole have the same length.

Also, at least a portion of the magnet 300 may have an arc shape in cross-section in the axial direction. Here, the "axial direction" means the reciprocating direction of the rotor 400.

In this embodiment, the magnet 300 may have a cylindrical shape.

For another example, the magnet 300 may have the arc shape in cross-section when viewed in the axial direction and be provided in plurality to be spaced apart from each other along the circumferential direction on the outer circumferential of the inner stator 110 or the inner circumferential surface of the outer stator 120.

Here, the magnet 300 may be in a state of being exposed to the gap 130.

Magnet fixing surfaces 115 and 125 to which the magnet 300 is fixed may be disposed on the facing surfaces of the inner stator 110 and the outer stator 120, which define the gap 130.

The magnet fixing surfaces 115 and 125 may be formed to correspond to a shape of the inner surface or the outer surface of the magnet 300.

For example, in case in which the magnet 300 is fixed to the outer stator 120, when the magnet 300 has a curved outer surface, the magnet fixing surface 125 of the outer stator 120 may also have a curved shape, and when the magnet 300 has a planar outer surface, the magnet fixing surface 125 of the outer stator 120 may also have a planar shape.

For another example, in case in which the magnet 300 is fixed to the inner stator 110, when the magnet 300 has a curved inner surface, the magnet fixing surface 115 of the inner stator 110 may also have a curved shape, and when the magnet 300 has a planar inner surface, the magnet fixing surface 115 of the inner stator 110 may also have a planar shape.

For reference, if the outer surface or the inner surface of the magnet 300 has a curved shape, the outer circumferential surface or the inner circumferential surface of the inner stator 110 may have a circular shape.

Also, if the outer surface or the inner surface of the magnet 300 has a planar shape, the outer surface of the inner stator 110 or the inner surface of the outer stator 120 may have a polygonal shape.

As illustrated in FIGS. 1 to 5, the magnet 300 may be fixed to the outer stator 120. In addition, as illustrated in FIG. 6, the magnet 300 may be fixed to the inner stator 110.

Although not shown, for another example, the magnet 300 may be fixed to each of both sides of the inner stator 110 and the outer stator 120.

The rotor 400 may be disposed in the gap 130 to which the magnet 300 is exposed and be made of a magnetic material to reciprocate with respect to the stator 100 and the magnet 300.

Here, the rotor 400 may be disposed to be spaced apart from the magnet coil 200 in the reciprocating direction of the rotor 400. Thus, a distance between the magnet coil 200 and the rotor 400 may vary according to the reciprocating motion of the rotor 400. That is, the rotor 400 and the magnet coil 200 may be disposed so that the rotor 400 and the magnet coil 200 do not overlap each other in the radius direction of the stator 100. According to the related art, the rotor 400 and the magnet coil 200 may not overlap each other in the radius direction of the stator 100, and thus, the motor may increase in diameter. On the other hand, according to an embodiment, since the rotor 400 and the magnet coil 200 are disposed to be spaced apart from each other in the reciprocating direction of the rotor 400, the motor may be reduced in diameter when compared to that of the motor according to the related art.

In this embodiment, at least a portion of the rotor 400 may have an arc shape in a cross-section in the axial direction.

That is, the rotor 400 may have a hollow cylindrical shape to be inserted into the gap 130 defined between the inner stator 110 and the outer stator 120, each of which has the cylindrical shape or may be provided in plurality to be spaced apart from each other in a circumferential direction and thus have an arc shape in cross-section when viewed in the axial direction.

The rotor 400 may include a moving core 410 disposed in the gap 130 and made of a magnetic material to reciprocate with respect to the stator 100 and the magnet 300 and a hollow connection member 420 made of a nonmagnetic material and supporting the moving core 410 so that the moving core 410 is exposed to the gap 130 toward the magnet 300.

For example, the connection member 420 may have a cylindrical shape, and the moving core 410 may be fixed to an inner surface or an outer surface of the connection member 420. Also, the connection member 420 may be made of a nonmagnetic material so that the connection member 420 does not affect a flow of a flux.

When the moving core 410 is fixed to the connection member 420 so as to be exposed to the gap 130 as described above, the magnetic gap between the magnet 300 and the moving core 410 may be minimized.

In this embodiment, the rotor 400 may be inserted to be spaced a predetermined distance from the outer surface of the inner stator 110 or the outer stator 120, which is exposed to the gas 130, and the magnet 300. For this, the rotor 400 may have a size less than that of the gap 130.

That is, the inner circumferential surface of the rotor 400 may have a diameter greater than that of the outer circumferential surface of the inner stator 110, and the outer circumferential surface of the rotor 400 may have a diameter less than that of the inner circumferential surface of the outer stator 120.

The reciprocating motor according to this embodiment reciprocates by centering force in the reciprocating direction, which is generated between the stator 100 in which the magnet coil 200 is provided, the magnet 300, and the rotor 400. The centering force in the reciprocating direction means force that is stored toward a side to which the magnetic energy (magnetic position energy, magnetic resistance) is lower when the rotor 400 moves within magnetic fields, and this force may generate magnetic spring.

Thus, in this embodiment, when the rotor 400 reciprocates by the magnetic force due to the magnet coil 200 and the magnet 300, the rotor 400 may accumulate force that intends to return to the centering direction by the magnetic spring, and thus, the rotor 400 may continuously reciprocate while being resonant due to the force accumulated in the magnetic spring.

Hereinafter, an operation principle of the moving core-type reciprocating motor according to this embodiment will be described in more detail.

First, when the alternate current is applied to the magnet coil 200 of the reciprocating motor, an alternate magnetic flux is generated between the inner stator 110 and the outer stator 120. In this case, the rotor 400 may move in both directions along the flux direction to continuously reciprocate.

Here, magnetic resonance spring may be generated between the rotor 400, the stator 100, and the magnet 300 within the reciprocating motor to induce a resonance motion of the rotor 400.

Figure 4:
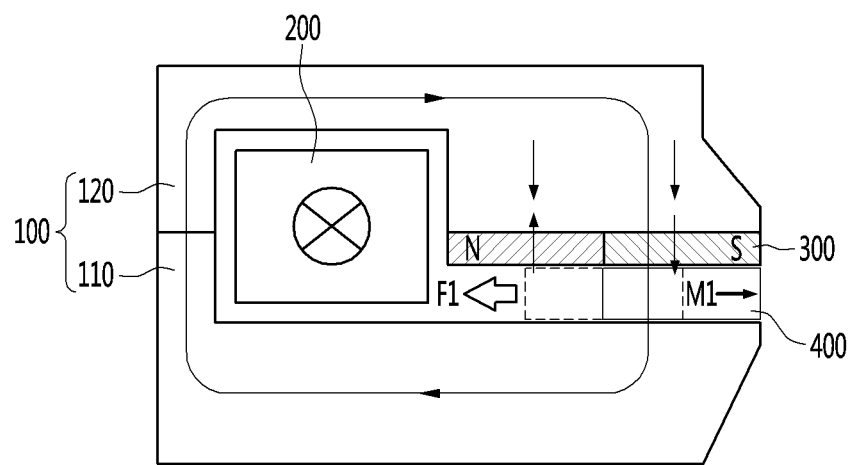
FIGS. 4 and 5 are schematic views for explaining an operation of the moving core-type reciprocating motor according to an embodiment.
Figure 5:
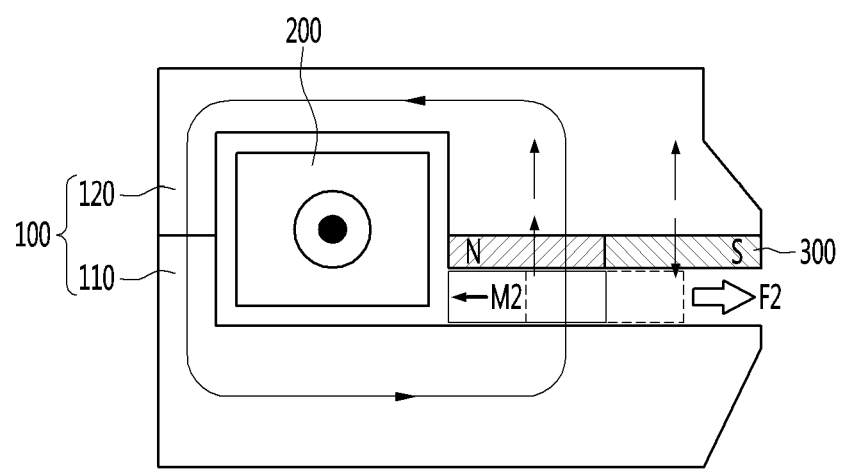

FIGS. 4 and 5 are schematic view for explaining an operation of the moving core-type reciprocating motor according to an embodiment.

For example, as illustrated in FIG. 4, in the state in which the magnet 300 is fixed to the outer stator 120, and the flux due to the magnet 300 flows in a clockwise direction in the drawing, when the alternate current is applied to the magnet coil 200, the flux due to the magnet coil 200 may flow in the clockwise direction in the drawing, and the rotor 400 may move in a right direction (see an arrow M1) in the drawing, in which the flux due to the magnet coil 200 and the flux due to the magnet 300 are magnetized to increase.

Here, centering force F1 that intends to return to a left direction in the drawing in which the magnetic energy (i.e., the magnetic position energy or the magnetic resistance) is lower may be accumulated between the rotor 400, the stator 100, and the magnet 300.

In this state, as illustrated in FIG. 5, when the current applied to the magnet coil 200 is changed in direction, the flux due to the magnet coil 200 may flow in a counterclockwise direction in the drawing, and the flux due to the magnet coil 200 and the flux due to the magnet 300 may be magnetized to increase in an opposite direction, i.e., a left direction in the drawing.

Here, the rotor 400 may move in the left direction (see an arrow M2) in the direction by the accumulated centering force F1 and the magnetic force due to the fluxes of the magnet coil 200 and the magnet 300.

In this process, the rotor 400 may pass through a center of the magnet 300 to further move to the left in the drawing by the inertial force and the magnetic force.

Here, likewise, the centering force F2 that intends to return to the centering direction of the magnet 300 in which the magnetic energy is lower, i.e., the right direction in the drawing may be accumulated between the rotor 400, the stator 100, and the magnet 300.

Referring again to FIG. 4, when the current applied to the magnet coil 200 is changed in direction, the rotor 400 may move in the centering direction of the magnet 300 by the accumulated centering force F2 and the magnetic force due to the fluxes of the magnet coil 200 and the magnet 300. Here, the rotor 400 may pass through the center of the magnet 300 to further move to the right direction in the drawing by the inertial force and the magnetic force, and the centering force F1 that intends to return to the centering direction of the magnet 300 in which the magnetic energy is lower, i.e., the left direction in the drawing may be accumulated between the rotor 400, the stator 100, and the magnet 300. Thus, the rotor 400 may continuously repeat the reciprocating motion that alternately moves to the right side and the left side in the drawing, like the case in which the mechanical resonance spring is provided.

Hereinafter, although not shown, when the magnet 300 is fixed to the inner stator 110, the resonance movement of the rotor will be described.

In the state in which the magnet 300 is fixed to the inner stator 110, and the flux due to the magnet 300 flows in the clockwise direction, when the alternate current is applied to the magnet coil 200, and the flux due to the magnet coil 200 flows in the clockwise direction, the rotor 400 may move in the left direction in the drawing, in which the flux due to the magnet coil 200 and the flux due to the magnet 300 are magnetized to increase.

Here, the centering force is accumulated in the right direction.

In this state, when the current applied to the magnet coil 200 is changed in direction, the flux due to the magnet coil 200 may flow in the counterclockwise direction in the drawing, and the rotor 400 may move in the right direction in which the flux due to the magnet coil 200 and the flux due to the magnet 300 are magnetized to increase.

Here, the rotor 400 may move in the centering direction of the magnet 300 by the accumulated centering force and the magnetic force due to the fluxes of the magnet coil 200 and the magnet 300.

In this process, the rotor 400 may pass through the center of the magnet 300 to further move to the right direction in the drawing by the inertial force and the magnetic force.

Here, likewise, the centering force that intends to return to the left direction may be accumulated between the rotor 400, the stator 100, and the magnet 300. Through this manner, even though the magnet 300 is fixed to the inner stator 110, the rotor 400 may continuously repeat the reciprocating motion that alternately moves to the right side and the left side in the drawing, like the case in which the mechanical resonance spring is provided.

Figure 7:
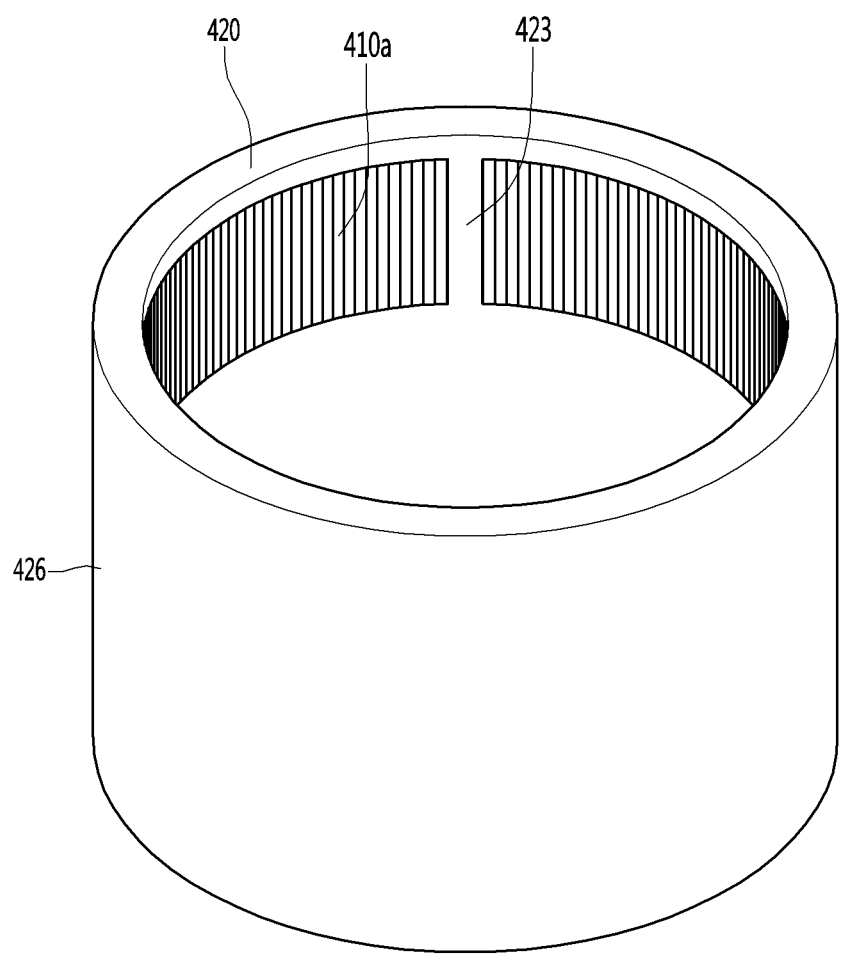
FIG. 7 is a perspective view illustrating an example of the rotor that is one of the components according to an embodiment.
Figure 8:
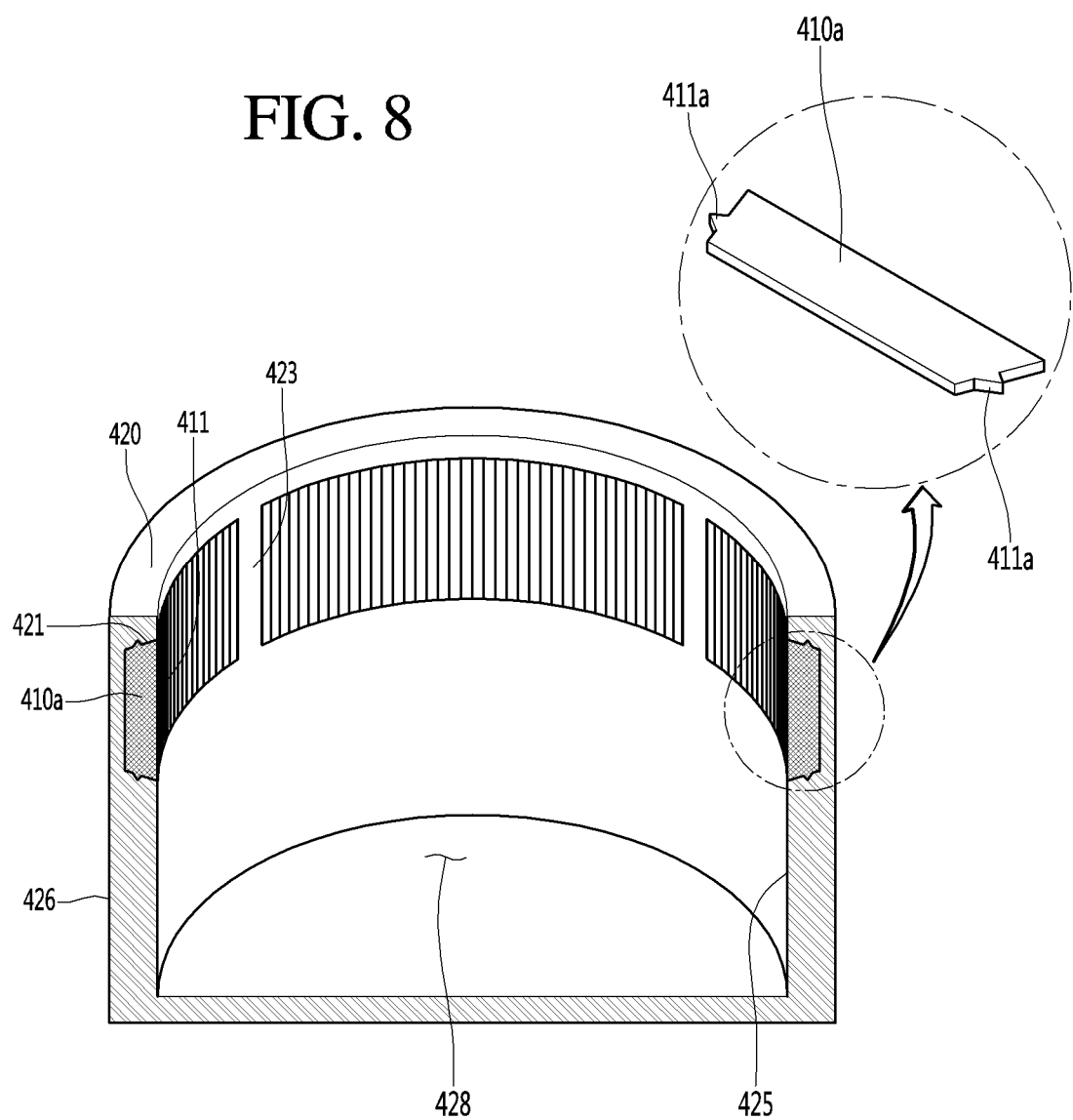
FIG. 8 is a partial cutaway perspective view illustrating an example of the rotor that is one of the components according to an embodiment.
Figure 9:
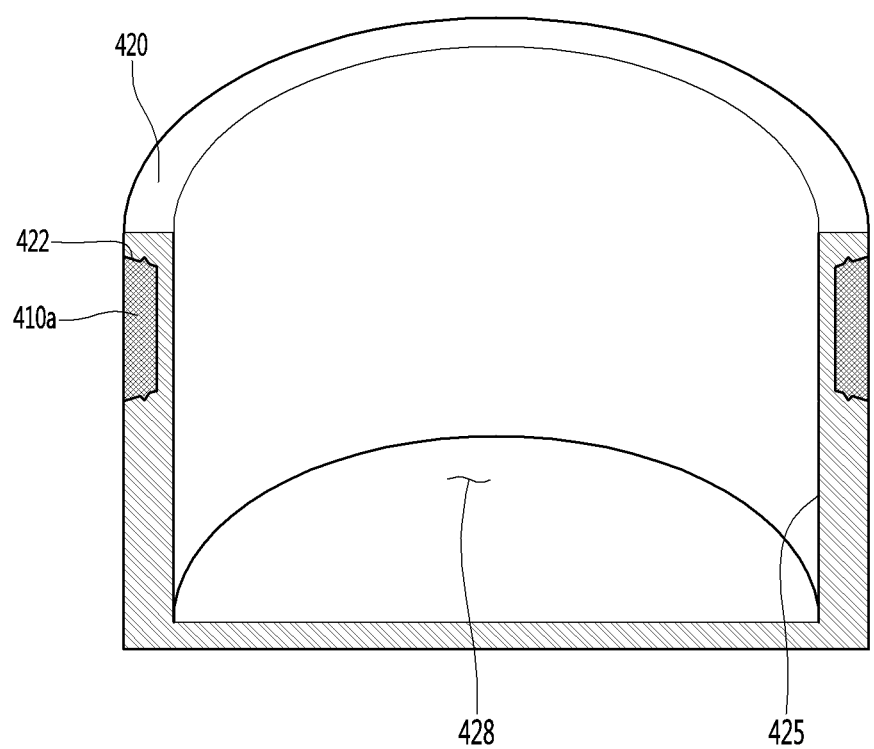
FIG. 9 is a perspective view illustrating another example of the rotor that is one of the components according to an embodiment.

FIG. 7 is a perspective view illustrating an example of the rotor that is one of the components according to an embodiment, FIG. 8 is a partial cutaway perspective view illustrating an example of the rotor that is one of the components according to an embodiment, and FIG. 9 is a perspective view illustrating another example of the rotor that is one of the components according to an embodiment.

Referring to FIGS. 7 to 9, the moving core 410 may be fixed to an inner circumferential surface 425 of the connection member 420 so as to be exposed to the inside of the connection member 420 or fixed to an outer circumferential surface 426 of the connection member 420 so as to be exposed to the outside of the connection member 420.

As described above, the connection member 420 has a hollow and includes the inner circumferential surface 425 and the outer circumferential surface 426.

Thus, the moving core 410 may be fixed to the inner circumferential surface 425 or the outer circumferential surface 426 of the connection member 420.

For example, when the inner stator 110 is fixed to the magnet 300, the moving core 410 may be fixed to the inner circumferential surface 425 of the connection member 420 to face the magnet 300.

For another example, when the outer stator 120 is fixed to the magnet 300, the moving core 410 may be fixed to the outer circumferential surface 426 of the connection member 420 to face the magnet 300.

When the moving core 410 is fixed to the inside or outside of the connection member 420, the magnetic gap between the magnet 300 and the moving core 410 may be minimally reduced. In general, the magnetic spring stiffness of the motor may be maximized when the gas is small. Thus, the motor spring stiffness may increase in proportion to the reduced magnetic gap.

Also, unlike the related art, according to an embodiment, it may be unnecessary to surround the moving core 410 by using the coating layer made of a fiber or a resin so as to prevent the moving core 410 from being separated. Thus, the motor may be simplified in structure and be easily manufactured.

According to an embodiment, although the coating layer 410 is removed, the fixing force of the moving core 410 may be secured to prevent the moving core 410 from being separated from the connection member 420.

Also, according to an embodiment, the rotor 400 may be minimally reduced in weight to increase in driving frequency so that the motor operates at a high speed.

Also, according to an embodiment, the magnet 300 according to the related art may be reduced with respect to the required magnetic spring stiffness to reduce manufacturing costs.

In this embodiment, the connection member 420 may have buried grooves 421 and 422 that are recessed inward in the inner circumferential surface 425 or the outer circumferential surface 426 of the connection member 420, and at least a portion of the moving core 410 is buried in and fixed to the buried grooves 421 and 422.

Although the moving core 410 has one surface that is attached and fixed to the inner circumferential surface 425 or the outer circumferential surface 426 of the connection member 420, a portion or the whole of the moving core 410 may be buried in and fixed to the buried grooves 421 and 422.

However, even though the whole of the moving core 410 is buried in the connection member 420, a surface of the moving core 410 facing the magnet 300 may be exposed to the gap 130.

As described above, when a portion or the whole of the moving core 410 is buried in the connection member 420, coupling force between the moving core 410 and the connection member 420 may increase to prevent the moving core 410 from being separated from the connection member 420 while the rotor 400 reciprocates.

Also, when a portion or the whole of the moving core 410 is buried in the connection member 420, since the rotor 400 decreases in thickness, the gas 130 in which the rotor 400 is disposed may decrease in size. Thus, the magnetic spring stiffness of the rotor 400 may be improved in proportion to the reduced size of the gap 130.

Also, as described above, when a portion or the whole of the moving core 410 is buried in the connection member 420, at least one protrusion that protrudes to the inside of the connection member 420 may be disposed on the buried portion. When the protrusion is provided as described above, the coupling force between the moving core 410 and the connection member 410 may increase to stably maintain the buried state without separating the moving core 410 from the connection member 420.

In this embodiment, the moving core 410 may be provided in plurality and be disposed to be spaced apart from each other in a circumferential direction of the connection member 420.

For example, when viewed in the axial direction, the moving core 410 may have an arc-shaped cross-section. In this case, when the moving cores 410 are disposed to be spaced apart from each other on the inner circumferential surface 425 or the outer circumferential surface 426 of the connection member 420 in the circumferential direction, the moving cores 410 may have a cylindrical shape on the whole.

As described above, when the moving core 410 is provided in plurality and disposed to be spaced apart from each other in the circumferential direction of the connection member 420, a joint part 423 may be disposed in parallel to the axial direction on each of the moving core 410 to improve the structural stiffness of the connection member 420, and also, the moving cores 410 may be more stably seated and supported on the connection member 420 through the joint parts 423.

Also, the moving core 410 may be more easily inserted into the buried grooves 421 and 422 defined in the inner circumferential surface 425 or the outer circumferential surface 426 of the connection member 420 to improve workability.

For another example, the moving core 410 may be provided as a single body. In this case, the moving core 410 may have a hollow cylindrical shape.

If the moving cores 410 are spaced apart from each other in the circumferential direction of the connection member 420, and also the magnets 300 are spaced apart from each other on the stator 100 in the circumferential direction, the number of magnets 300 and the number of moving cores 400 may be the same.

Also, the number of magnets 300 may be greater N times (N is a natural number) than that of moving core 410, or the number of moving cores 400 may be greater N times (N is a natural number) than that of magnets 300.

For example, the number of magnets 300 is 12, the number of moving cores 400 may be 6.

As described above, when the number of magnets 300 and the number of moving cores 400 are set, since eccentric force is not generated in the rotor 400, the rotor 400 may not rotate in any direction to reciprocate while maintaining a straight line.

Figure 10:
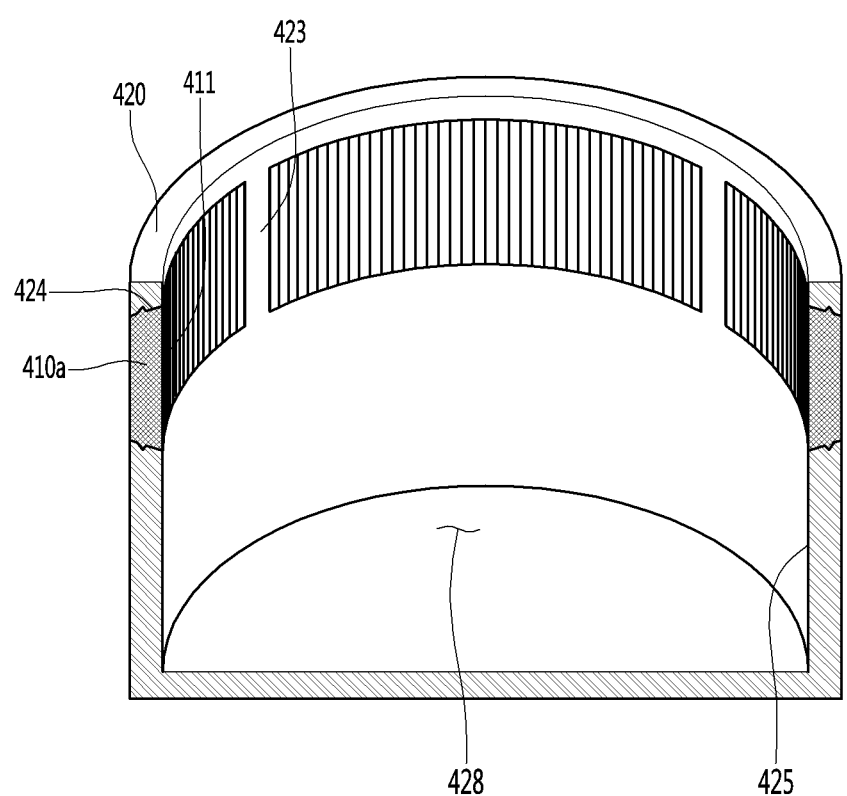
FIG. 10 is a perspective view illustrating a further another example of the rotor that is one of the components according to an embodiment.

FIG. 10 is a perspective view illustrating a further another example of the rotor that is one of the components according to an embodiment.

Referring to FIG. 10, the moving core 410 may pass through the connection member 420 and then be fixed to be exposed to the inside and outside of the connection member 420.

In this case, a hole 424 through which the moving core 410 passes may be defined in the connection member 420.

When the moving core 410 is exposed to the inside and outside of the connection member 420, both sides of the moving core 410 may be exposed to the gap 130 in the radius direction.

Thus, the magnetic gap between the rotor 400, the magnet 300, and the stator 100 may be reduced by a thickness of the omitted connection member 420, and the magnetic spring stiffness of the rotor 400 may be improved in proportion to the reduced size of the gap 130.

In this embodiment, the exposed surface 411 of the moving core 410, which is exposed to the inside or outside of the connection member 420, may be disposed in a straight line with the inner circumferential surface 425 or the outer circumferential surface 426 of the connection member 420.

That is, when the moving core 410 is buried in the inner circumferential surface 425 or the outer circumferential surface 426 of the connection member 420, the exposed surface 411 may be disposed in the straight line with the inner circumferential surface 425 or the outer circumferential surface 426 of the connection member 420 without protruding or being recessed from the inner circumferential surface 425 or the outer circumferential surface 426 of the connection member 420.

As described above, when the exposed surface 411 of the moving core 410 is disposed in the straight line with the inner circumferential surface 425 or the outer circumferential surface 426 of the connection member 420, the moving core 410 may be more stably fixed to the connection member 420. Also, while the rotor 400 reciprocates, the moving core 410 may be prevented from colliding with the stator 100 or the magnet 300.

When the moving core 410 passes through the connection member 420, a thickness of the connection member 420 in the radius direction may be the same as that of the moving core 410 in the radius direction to allow the moving core 410 to be disposed in the straight line with the inner circumferential surface 425 or the outer circumferential surface 426 of the connection member 420 without the inner and outer exposed surfaces 411 of the moving core protrude or are recessed from the inner circumferential surface 425 or the outer circumferential surface 426 of the connection member 420.

In this embodiment, the moving core 410 and the connection member 420 may be integrated with each other through insert-injection molding.

That is, when the connection member 420 is injection-molded after the moving core 410 is manufactured first, the moving core 410 may be put in a mold and molded to be integrated with the connection member 420.

In this case, the process of fixing the moving core 410 to the connection member 420 may be omitted to improve the workability.

Also, the coupling force between the moving core 410 and the connection member 420 may be improved to prevent the moving core 410 from being separated from the connection member 420.

In the above-described embodiment, although the moving core 410 and the connection member 420 are integrated with each other through the insert-injection molding, the scope of the present disclosure is not limited thereto. For example, the moving core 410 and the connection member 420 may be integrated with each other through various occurring methods.

Alternatively, the moving core 410 and the connection member 420 may be separately manufactured and then be integrated with each other to form one body through a separate assembly or attachment process.

In this embodiment, the connection member 420 may be made of a material such as a glass fiber.

For example, the connection member 420 may be manufactured by using only the glass fiber. For another example, the connection member 420 may be manufactured by mixing the glass fiber with plastic.

Since the glass fiber is a nonmagnetic and nonconductive material, when the connection member 420 is manufactured by using the material such as the glass fiber, the stiffness of the connection member 420 may be secured, and an eddy current loss of the rotor 400 may be reduced. Also, the connection member 420 may be injection-molded.

Here, the glass fiber may be fixed to be integrated with the moving core 410 through heating and curing processes.

Referring again to FIGS. 7 to 10, the moving core 410 may be manufactured by radially stacking a first segment 410*a*, which is disposed in parallel to the reciprocating direction of the moving core 410, in the circumferential direction of the connection member 420.

For example, the first segment 410*a* may have a rectangular fin shape having a thin thickness.

As described above, the first segment 410*a* may be radially stacked on the inner circumferential surface 425 or the outer circumferential surface 426 of the connection member 420.

Also, the whole of the first segment 410*a* may be radially stacked on the inner circumferential surface 425 or the outer circumferential surface 426 of the connection member 420 in only a partial section.

In the latter case, first segment units in which the plurality of first segments 410*a* are sequentially stacked may be disposed to be spaced a predetermined distance from each other in the circumferential direction of the connection member 420.

Also, in this embodiment, the first segments 410*a* may be disposed to correspond to the inner core block 110*a* and the outer core block 120*a*, which are described above.

As described above, when the plurality of first segments 410*a* are radially stacked to constitute the moving core 410, eddy current may be reduced.

Figure 11:
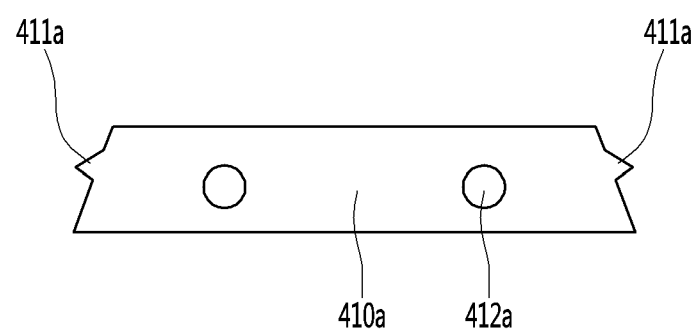
FIG. 11 is a perspective view illustrating an example of a first segment that is one of the components according to an embodiment.
Figure 12:
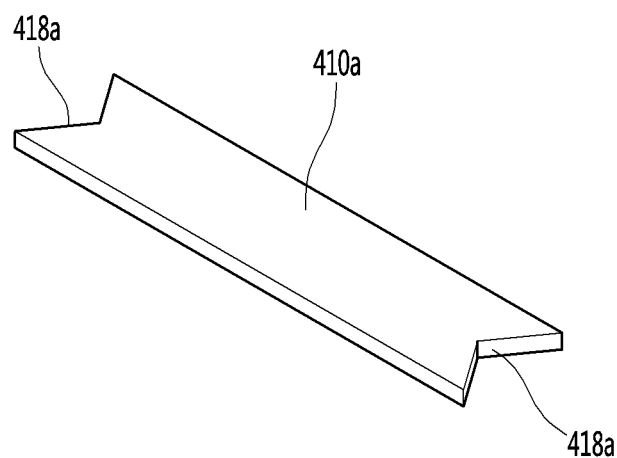
FIG. 12 is a perspective view illustrating another example of the first segment that is one of the components according to an embodiment.

FIG. 11 is a perspective view illustrating an example of the first segment that is one of the components according to an embodiment, and FIG. 12 is a perspective view illustrating another example of the first segment that is one of the components according to an embodiment.

Referring to FIGS. 11 and 12, the first segment 410*a* may include a fixing protrusion 411*a* protruding to the inside of the connection member 420 may be disposed on at least one surface thereof which comes into contact with the connection member 420.

For example, the fixing protrusion 411*a* may be disposed in parallel to the reciprocating direction of the rotor 400 on each of both sides of the first segment 410*a*.

Here, a fixing groove into which the fixing protrusion is inserted may be defined in the connection member 420.

For another example, a recessed fixing groove 418*a* may be defined in each of both sides of the first segment 410*a*, and the fixing protrusion inserted into the fixing groove 418*a* of the first segment 410*a* may be disposed on the connection member 420.

As described above, when the first segment 410*a* is provided with the fixing protrusion 411*a* or the fixing groove 418*a*, coupling force between the first segment 410*a* and the connection member 410 may be improved to maintain the stably fixed state without separating the first segment 410*a* from the connection member 420.

Referring again to FIG. 11, at least one hole 412*a* may be punched in the first segment 410*a*.

Here, a protrusion may be disposed on the connection member 420 in the circumferential direction so that the protrusion is inserted into the hole 412*a*.

When the hole 412*a* is defined as described above, the first segment 410 may be reduced in weight to reduce the total weight of the rotor 400.

Also, since the protrusion disposed on the connection member 420 in the circumferential direction is inserted into the hole 412*a*, the first segment 410*a* may be automatically aligned, and also, the coupling force between the first segment 410*a* and the connection member 420 may be improved.

Also, although the first segment 410*a* and the connection member 420 are injection-molded, a portion of plastic forming the connection member 420 may be permeated through the hole 412*a* to more improve the coupling force between the first segment 410*a* and the connection member 420.

Figure 13:
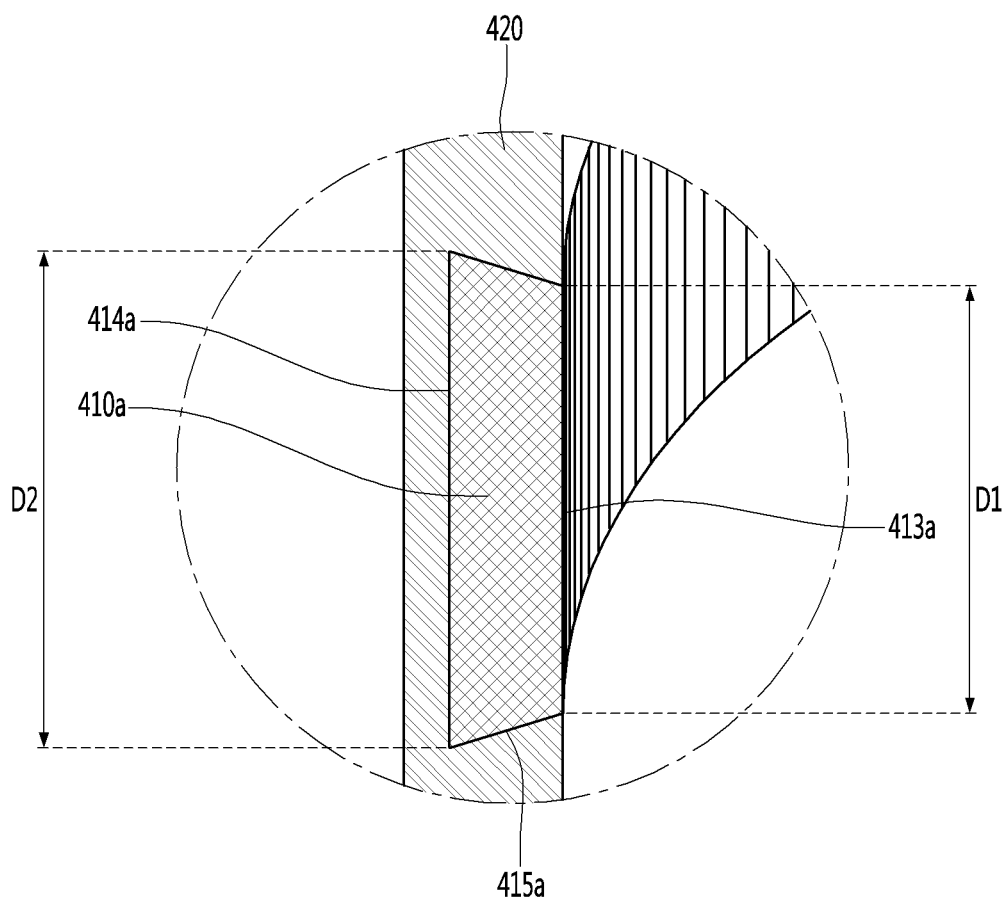
FIGS. 13 and 14 are perspective views illustrating a further another example of the rotor that is one of the components according to an embodiment.
Figure 14:
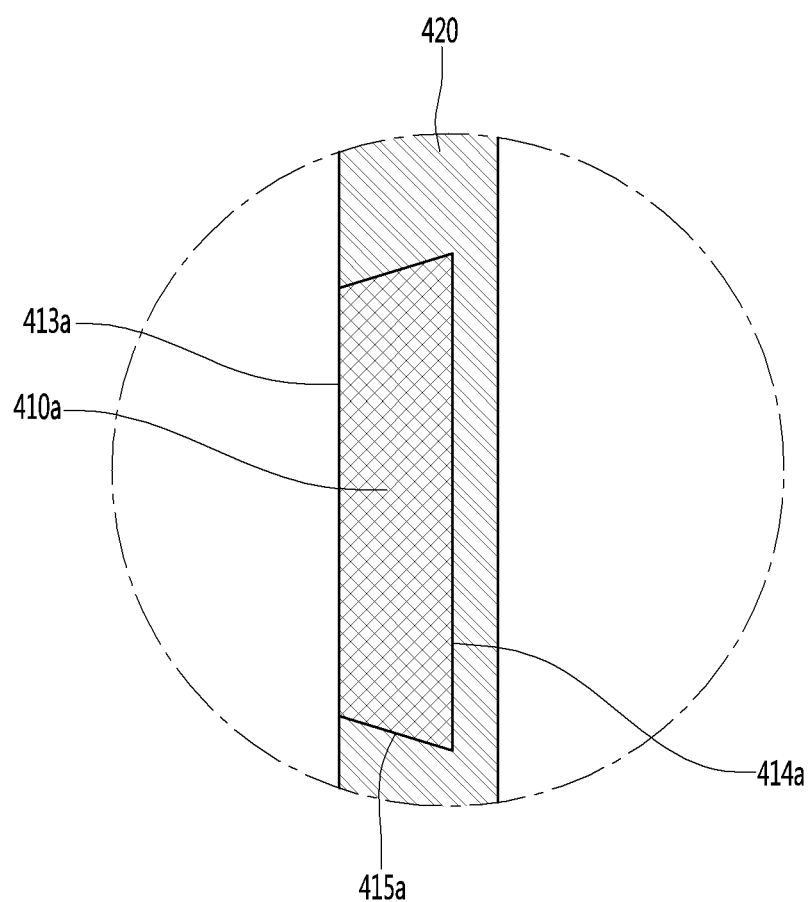

FIGS. 13 and 14 are perspective views illustrating a further another example of the rotor that is the component according to an embodiment.

Referring to FIGS. 13 and 14, an exposed surface 413*a* of the first segment 410*a*, which is exposed to the inside or outside of the connection member 420 may have a length D1 less than that D2 of a contact surface 414*a* thereof coming into contact with the connection member 420.

Here, when the exposed surface 413*a* and the contact surface 414*a* of the first segment 410*a* have the lengths D1 and D2 different from each other, an inclined surface 415*a* may be disposed on each of both surfaces of the first segment 410*a*.

As described above, when the exposed surface 413*a*, which is exposed to the inside or outside of the connection member 420 has the length D1 less than that D2 of the contact surface 414*a* thereof coming into contact with the connection member 420, the coupling force between the first segment 410*a* and the connection member 410 may be improved even though the first segment 410*a* is not provided with a separate fixing protrusion or fixing groove to prevent the first segment 410a from being separated from the connection member 420, thereby maintaining the stably fixed state.

Figure 15:
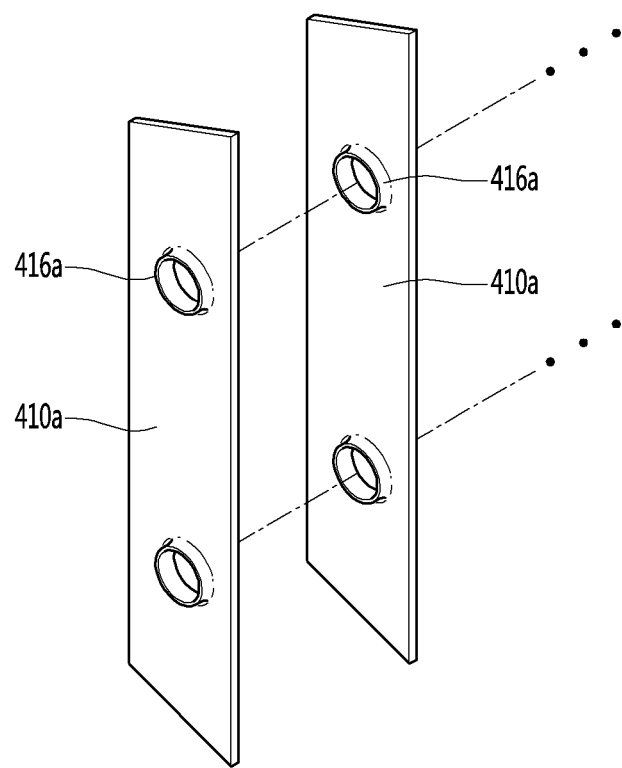
FIG. 15 is a perspective view illustrating further another example of the first segment that is one of the components according to an embodiment.
Figure 16:
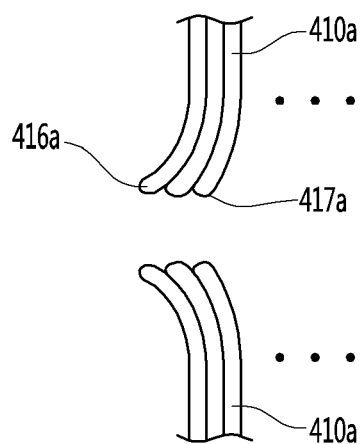
FIG. 16 is a cross-sectional view illustrating a state in which the first segment that is one of the components is stacked according to an embodiment.

FIG. 15 is a perspective view illustrating further another example of the first segment that is one of the components according to an embodiment, and FIG. 16 is a cross-sectional view illustrating a state in which the first segment that is one of the components is stacked according to an embodiment.

Referring again to FIGS. 15 and 16, the first segment 410a may include a protrusion part 416a protruding in parallel to the stacked direction and a groove part 417a that is recessed.

For example, the protrusion part 416a and the groove part 417a may be provided by stacking the first segments 410a and performing a punching process.

Alternatively, each of the first segment 410a may have an unevenness (凹凸) having various shapes.

As described above, in case in which the first segment 410a is provided with the protrusion part 416a and the groove part 417a, when the plurality of first segments 410a are stacked, the first segments 410a may be stacked while the protrusion part 416a may be inserted into the groove part 417a to easily perform the stacking process.

Also, when the inserted state of the protrusion part 416a into the groove part 417a is maintained after the stacking of the first segments 410a is completed, coupling force between the plurality of first segments 410a may be secured to firmly maintain the stacked state without disturbing the stacked shape.

Figure 17:
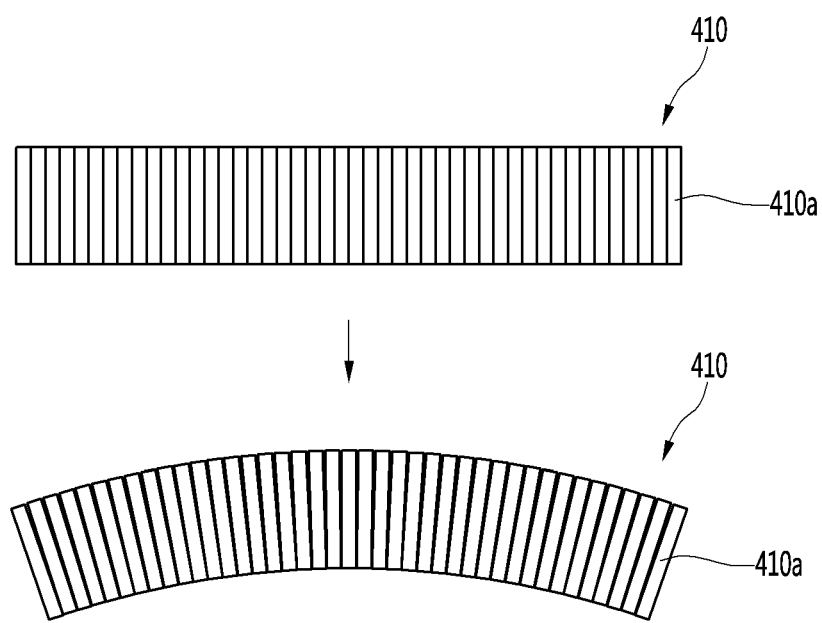
FIG. 17 is a conceptual view for explaining a process of radially stacking the first segment that is one of the components according to an embodiment.

FIG. 17 is a conceptual view for explaining a process of radially stacking the first segment that is the component according to an embodiment.

Referring to FIG. 17, the first segments 410a may be radially stacked in a manner in which each of the first segments 410a is processed to have a curvature after the first segments 410a are straightly stacked in parallel to each other. Thus, the radial stacking of the first segments 410a may be more easily performed.

Here, when the first segment 410a is provided with the protrusion part 416a and the groove part 417a, which are described above, the straight stacking may be easily performed, and also, the coupling between the plurality of first segments 410a may be secured. As a result, each of the first segments 410a stacked in the straight line may be easily processed to have a predetermined curvature.

Figure 18:
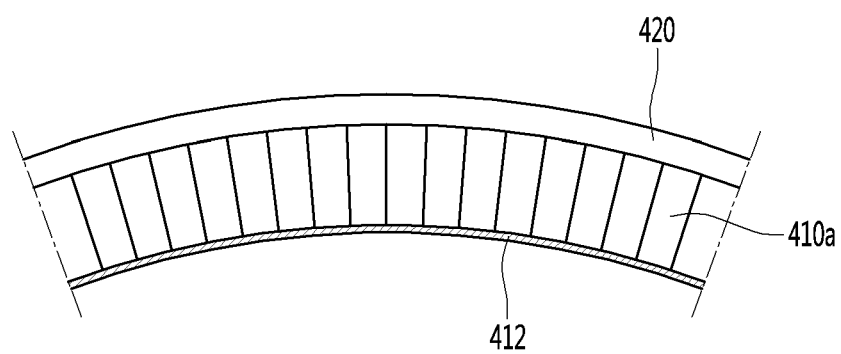
FIGS. 18 and 19 are cross-sectional views illustrating a further another example of the rotor that is one of the components according to an embodiment.
Figure 19:
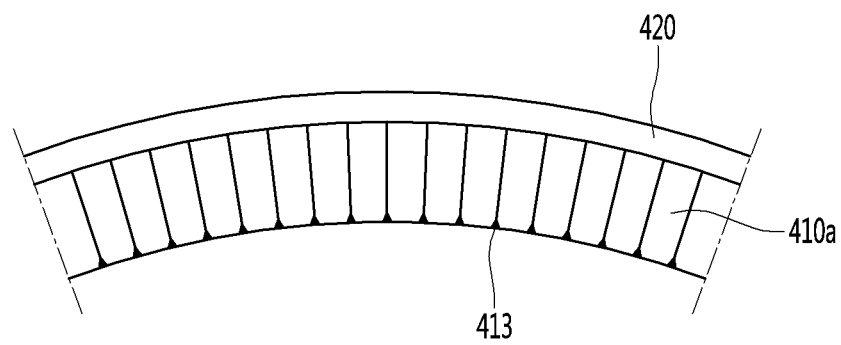

FIGS. 18 and 19 are cross-sectional views illustrating a further another example of the rotor that is the component according to an embodiment.

Referring to FIG. 18, in the moving core 410, an adhesive may be applied to the exposed surface, which is exposed to the inside or outside of the connection member 420, to connect the plurality of stacked first segments 410a to each other.

When the first segments 410a are connected to each other through the adhesive as described above, the coupling force between the first segments 410a may be secured.

Even when the radial stacking of the first segments 410a is performed in the manner in which the first segments 410a are straightly stacked and processed to have the curvature, when the adhesive is applied to the inner surface of each of the stacked first segments 410a to form an adhesion layer 412, and then, each of the first segments 410a is processed to have the curvature, since the curvature forming process is performed in the state in which the coupling force between the first segments 410a is secured, the radial stacking of the first segments 410a may be more easily performed.

Referring to FIG. 19, in the moving core 410, the exposed surface, which is exposed to the inside or outside of the connection member 420, may be welded to connect the plurality of stacked first segments 410a to each other.

When the first segments 410a are connected to each other through the welding as described above, the coupling force between the first segments 410a may be secured.

Even when the radial stacking of the first segments 410a is performed in the manner in which the first segments 410a are straightly stacked and processed to have the curvature, when the inner surface of each of the stacked first segments 410a is welded to form a welding part 413, and then, each of the first segments 410a is processed to have the curvature, since the curvature forming process is performed in the state in which the coupling force between the first segments 410a is secured, the radial stacking of the first segments 410a may be more easily performed.

Figure 20:
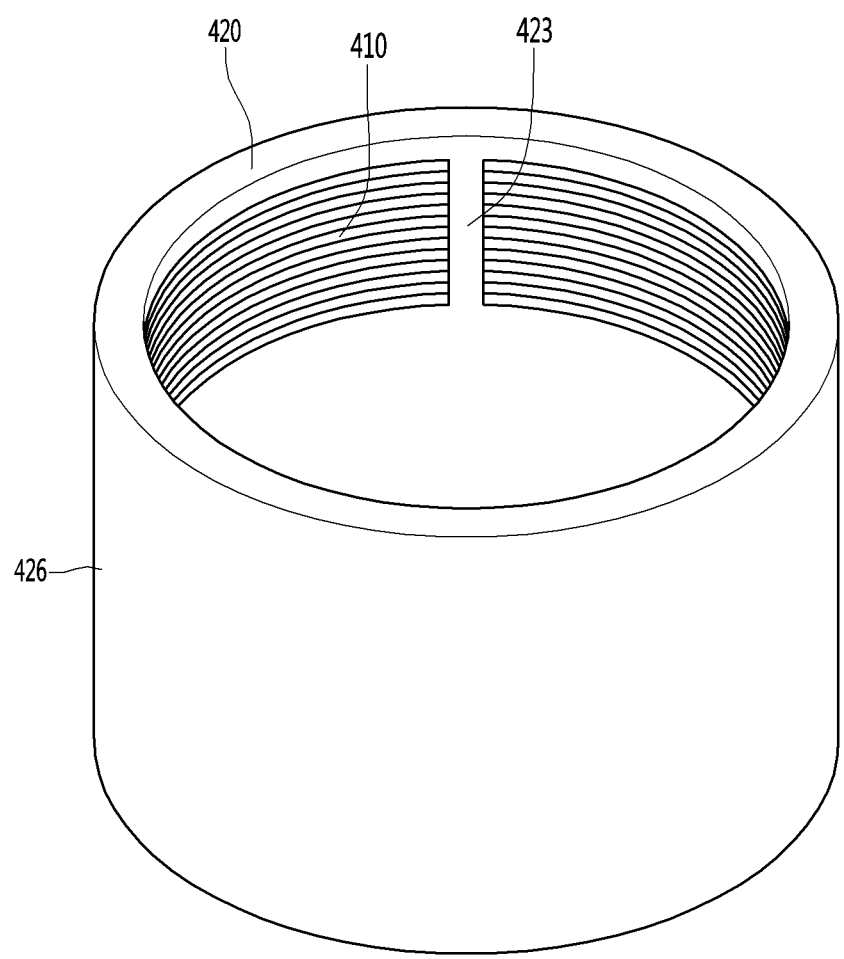
FIG. 20 is a perspective view illustrating a further another example of the rotor that is one of the components according to an embodiment.
Figure 21:
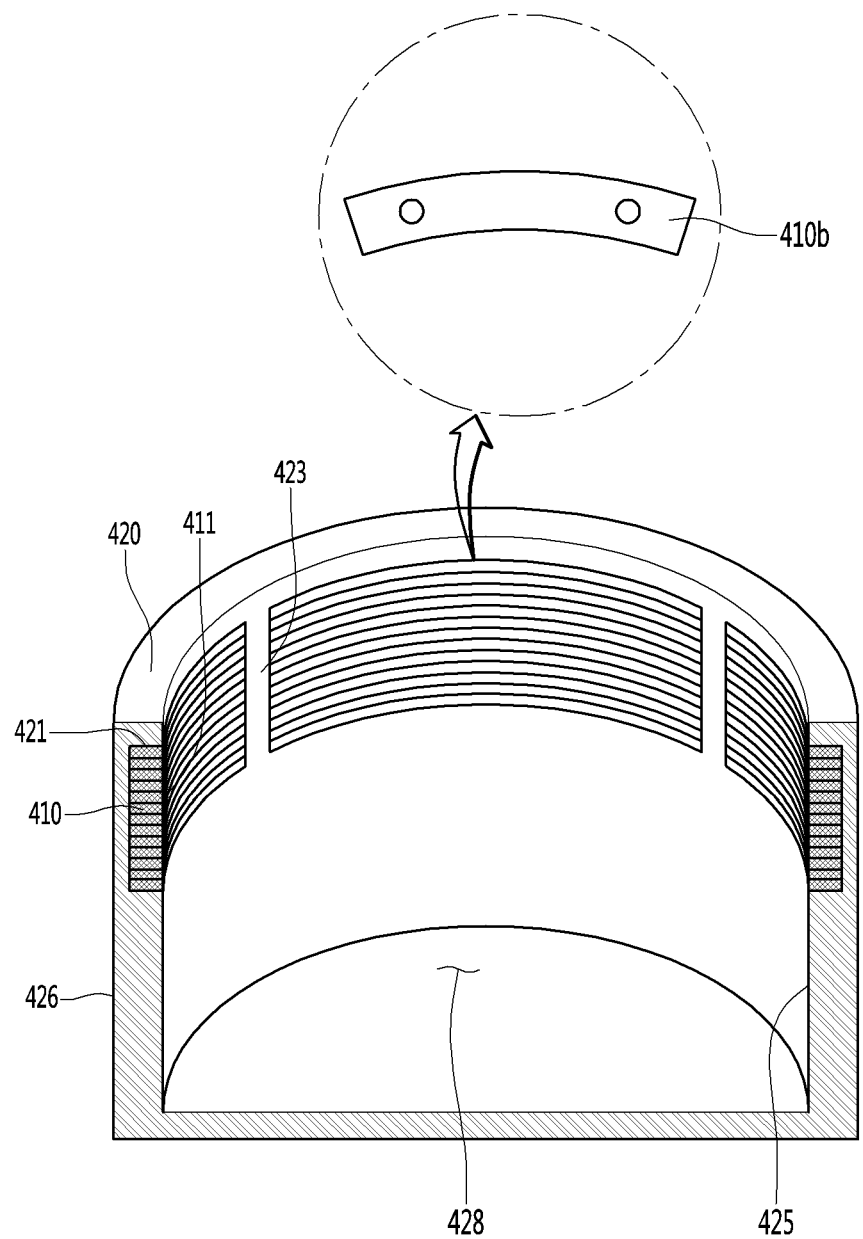
FIG. 21 is a partial cutaway perspective view illustrating further another example of the rotor that is one of the components according to an embodiment.
Figure 22:
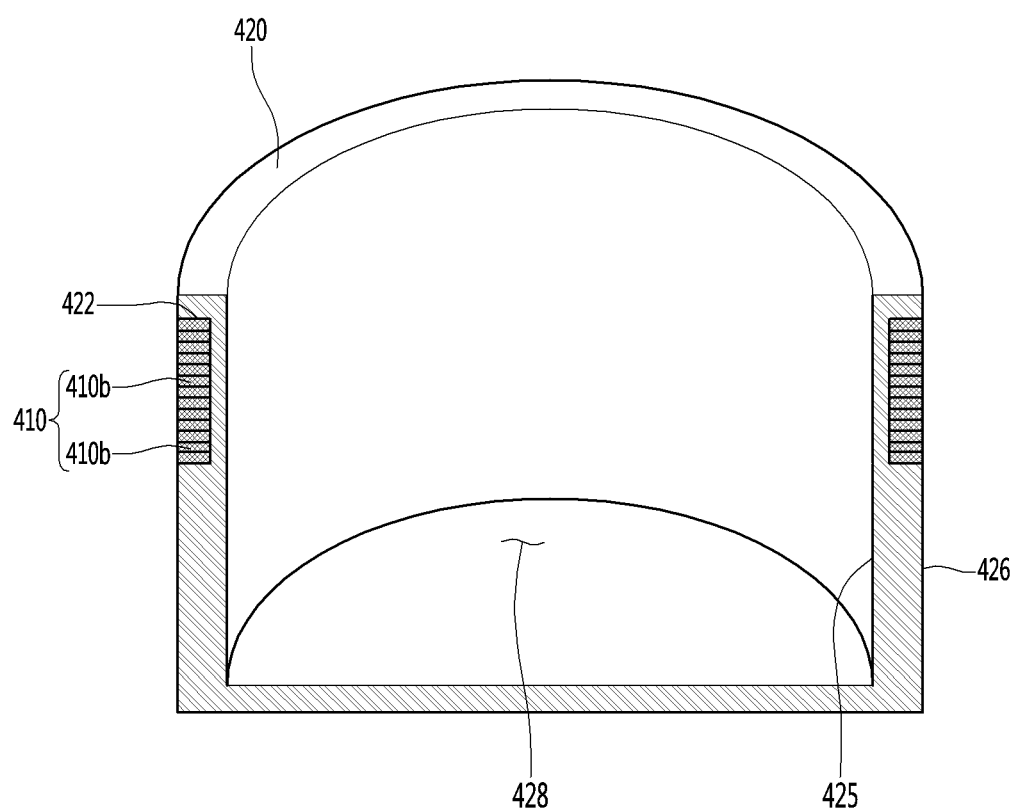
FIG. 22 is a perspective view illustrating further another example of the rotor that is one of the components according to an embodiment.
Figure 23:
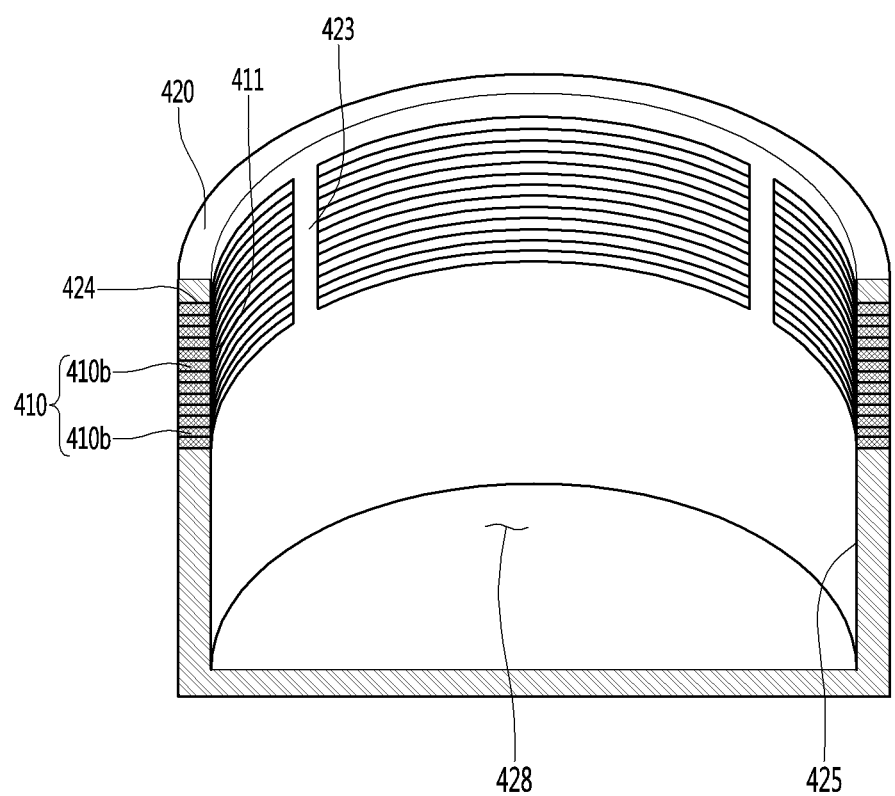
FIG. 23 is a perspective view illustrating a further another example of the rotor that is one of the components according to an embodiment.

FIG. 20 is a perspective view illustrating a further another example of the rotor that is one of the components according to an embodiment, FIG. 21 is a partial cutaway perspective view illustrating further another example of the rotor that is one of the components according to an embodiment and FIGS. 22 and 23 are perspective views illustrating further another example of the rotor that is one of the components according to an embodiment.

Referring again to FIGS. 20 to 23, the moving core 410 may be manufactured by stacking second segments 410b, which are disposed in parallel to the circumferential direction of the connection member 420, in the reciprocating direction of the moving core 410.

For example, at least a portion of each of the second segments 410b may have an arc shape and also have a fin shape with a thin thickness.

As described above, the second segment 410b may be stacked on the inner circumferential surface or the outer circumferential surface of the connection member 420 in the reciprocating direction of the rotor 400.

Also, the second segment 410b may be disposed the whole inner circumferential surface or outer circumferential surface of the connection member 420 or disposed in only a portion of the section.

In the latter case, second segment units in which the plurality of second segments 410b are sequentially stacked may be disposed to be spaced a predetermined distance from each other in the circumferential direction of the connection member 420.

For another example, the second segment 410b may have a circular shape.

As described above, when the plurality of second segments 410b are stacked to constitute the moving core 410, the eddy current may be reduced.

Figure 24:
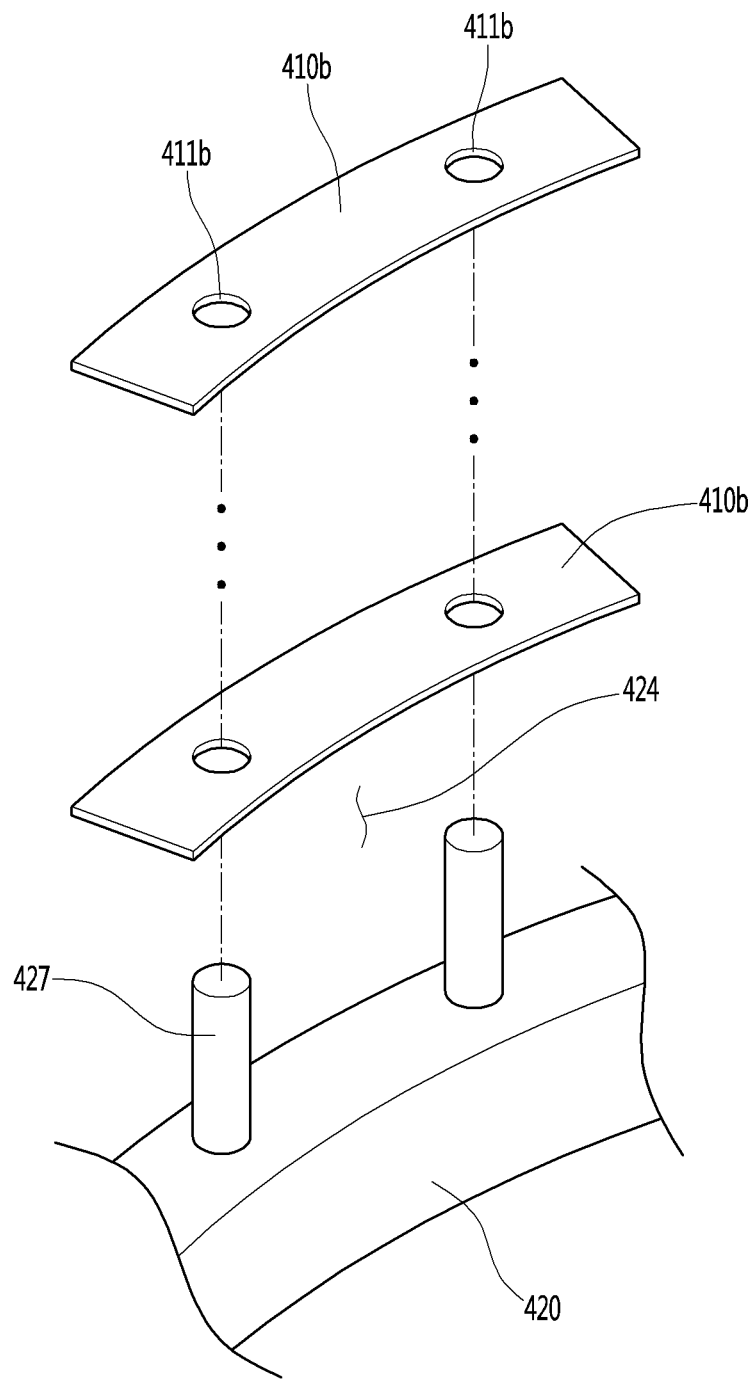
FIG. 24 is an exploded perspective view of a second segment and a connection member, each of which is one of the components according to an embodiment.

FIG. 24 is an exploded perspective view of the second segment and the connection member, each of which is one of the components according to an embodiment.

Referring to FIG. 24, at least one connection hole 411b may be punched in the second segment 410b, and a connection protrusion 427 disposed in parallel to the stacking direction of the second segments 410b may be disposed on the connection member 420. Thus, while the connection protrusion 427 is inserted into the connection hole 411b, the second segments 410b may be stacked.

First, as described above, when the connection hole 411b is punched in the second segment 410b, the second segment may be reduced in weight to reduce the total weight of the rotor 400.

Also, the stacking of the second segments 410*b* may be more easily performed, and the coupling force between the second segment 410*b* and the connection member 420 may be improved.

Also, although the second segment 410*b* and the connection member 420 are injection-molded, a portion of plastic forming the connection member 420 may be permeated through the connection hole 411*b* to more improve the coupling force between the second segment 410*b* and the connection member 420.

Figure 25:
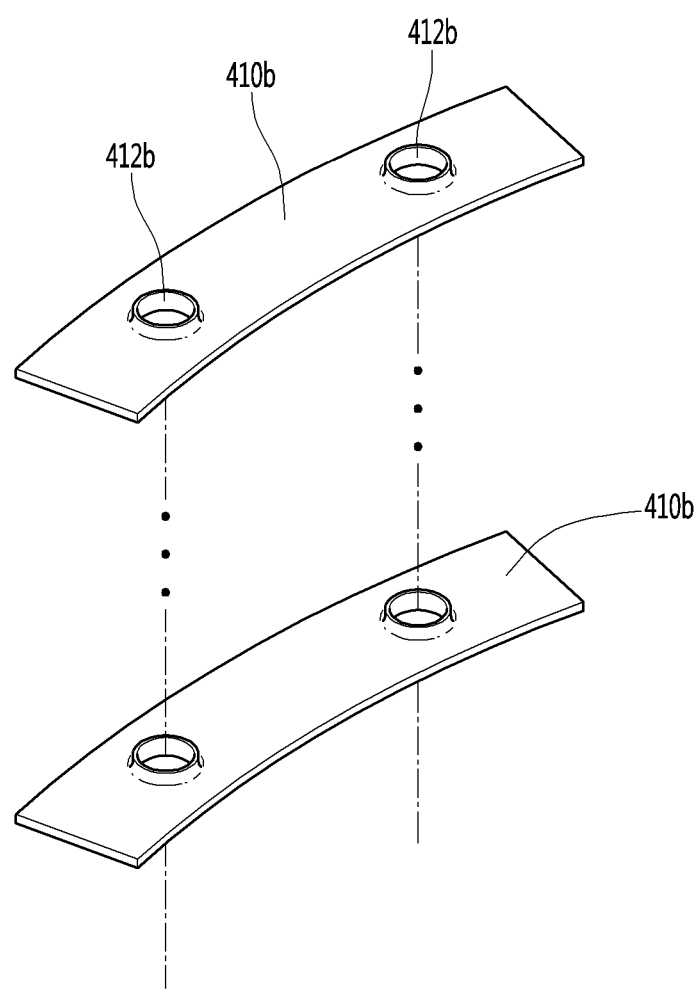
FIG. 25 is a perspective view illustrating another example of the second segment that is one of the components according to an embodiment.
Figure 26:
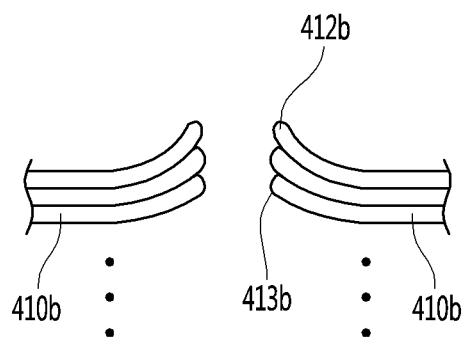
FIG. 26 is a cross-sectional view illustrating a state in which the second segment that is one of the components is stacked according to an embodiment.

FIG. 25 is a perspective view illustrating another example of the second segment that is one of the components according to an embodiment, and FIG. 26 is a cross-sectional view illustrating a state in which the second segment that is one of the components is stacked according to an embodiment.

Referring again to FIGS. 25 and 26, the first segment 410*b* may include a protrusion part 412*b* protruding in parallel to the stacked direction and a groove part 413*b* that is recessed.

For example, the protrusion part 412*b* and the groove part 413*b* may be provided by stacking the second segments 410*b* and performing a punching process.

Alternatively, the second segment 410*b* may have an unevenness (凹凸) having various shapes.

As described above, in case in which the second segment 410*b* is provided with the protrusion part 412*b* and the groove part 413*b*, when the plurality of second segments 410*b* are stacked, the second segments 410*b* may be stacked while the protrusion part 412*b* may be inserted into the groove part 413*b* to easily perform the stacking process.

Also, when the inserted state of the protrusion part 412*b* into the groove part 413*b* is maintained after the stacking of the second segments 410*b* is completed, coupling force between the plurality of second segments 410*b* may be secured to firmly maintain the stacked state without disturbing the stacked shape.

Figure 27:
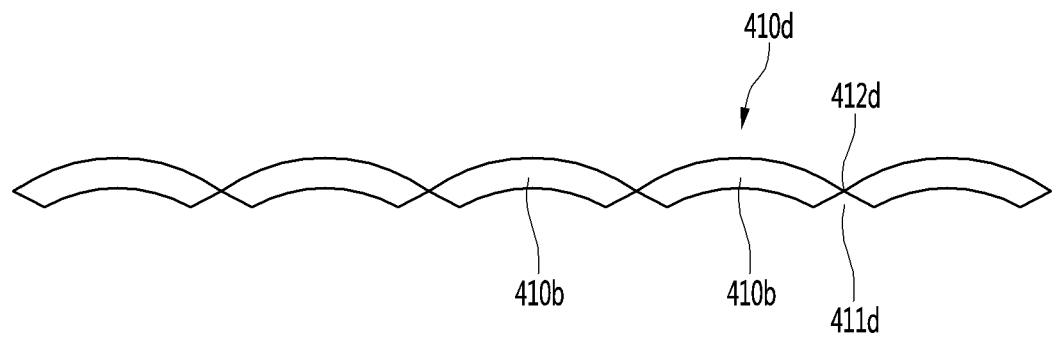
FIG. 27 is a view illustrating an example of a second segment band constituting a moving core that is one of the components according to an embodiment.
Figure 28:
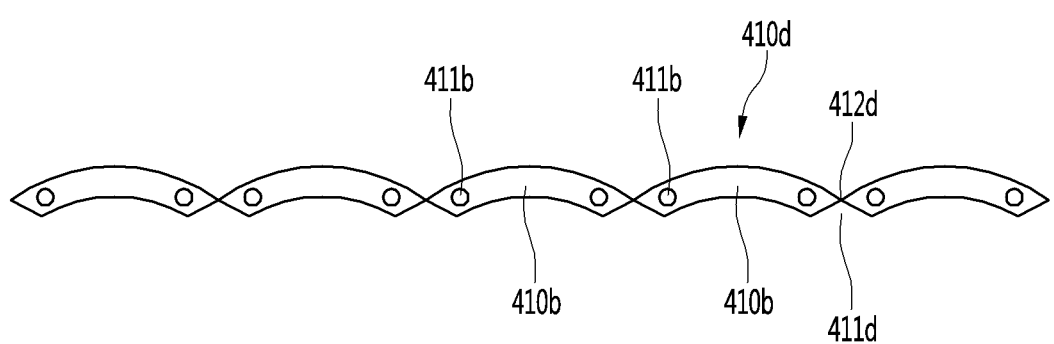
FIG. 28 is a view illustrating another example of the second segment band constituting the moving core that is one of the components according to an embodiment.
Figure 29:
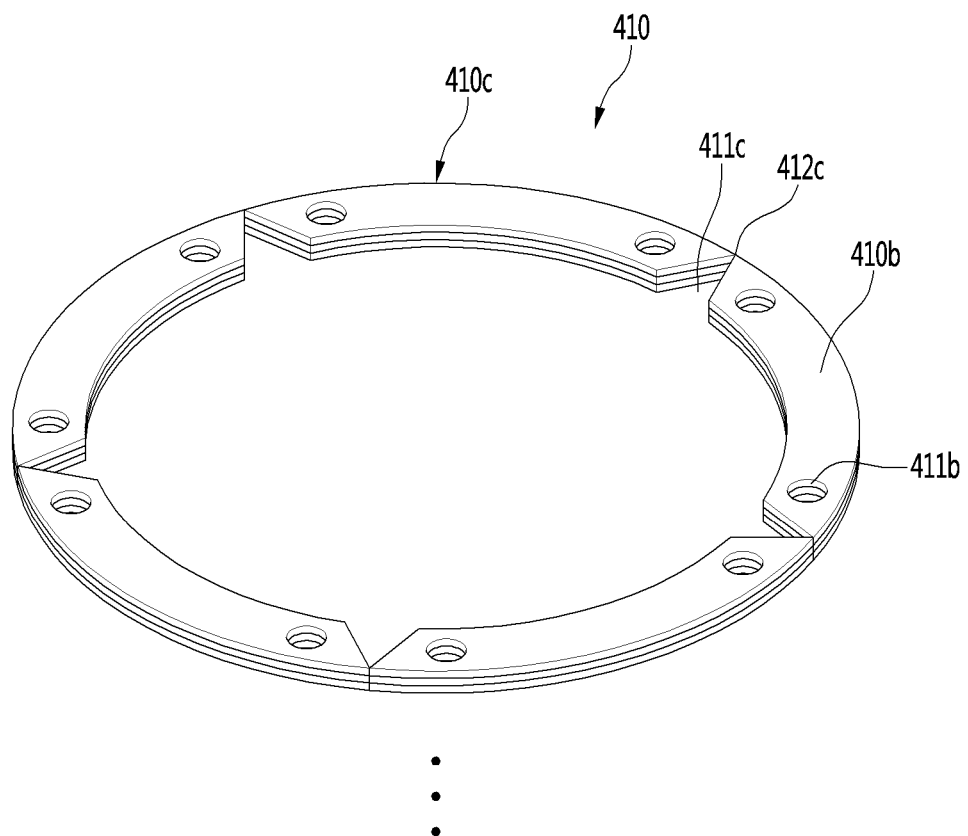
FIG. 29 is a view illustrating an example of a second segment ring constituting the moving core that is one of the components according to an embodiment.

FIG. 27 is a view illustrating an example of a second segment band constituting a moving core that is one of the components according to an embodiment, FIG. 28 is a view illustrating another example of the second segment band constituting the moving core that is one of the components according to an embodiment, and FIG. 29 is a view illustrating an example of a second segment ring constituting the moving core that is one of the components according to an embodiment.

Referring again to FIGS. 27 to 29, the moving core 410 may be manufactured by stacking second segment rings 410*c*, in which the second segments 410*b*, each of which has the arc shape, are continuously connected to each other to form a circular shape, in the reciprocating direction of the moving core 410.

Here, the second segments 410*b* constituting each of the second segment rings 410*c* may include connection parts 412*c* that come into point contact with each other and a cutoff part 411*c* between the second segments 410*b*.

As described above, when the circular second segment ring 410*c* is stacked to constitute the moving core 410, a distance between the second segments 410*b* may be secured by the cutoff part 411*c*. Thus, the second segments 410*b* may be stacked once in the circumferential direction to improve the workability.

In addition, the coupling force between the second segments 410*b* may also be secured to improve the structural stiffness of the moving core 410.

In this embodiment, the second segment ring 410*c* may be manufactured by cutting a second segment band 410*d* in which the second segments 410*b* are continuously connected to each other and connecting both ends to each other to form a closed loop.

As described above, when the second segment ring 410*c* is manufactured by using the second segment band 410*d*, the second segment band 410*d* that is a length material may be easily manufactured through blanking to improve the workability and reduce manufacturing costs.

Figure 30:
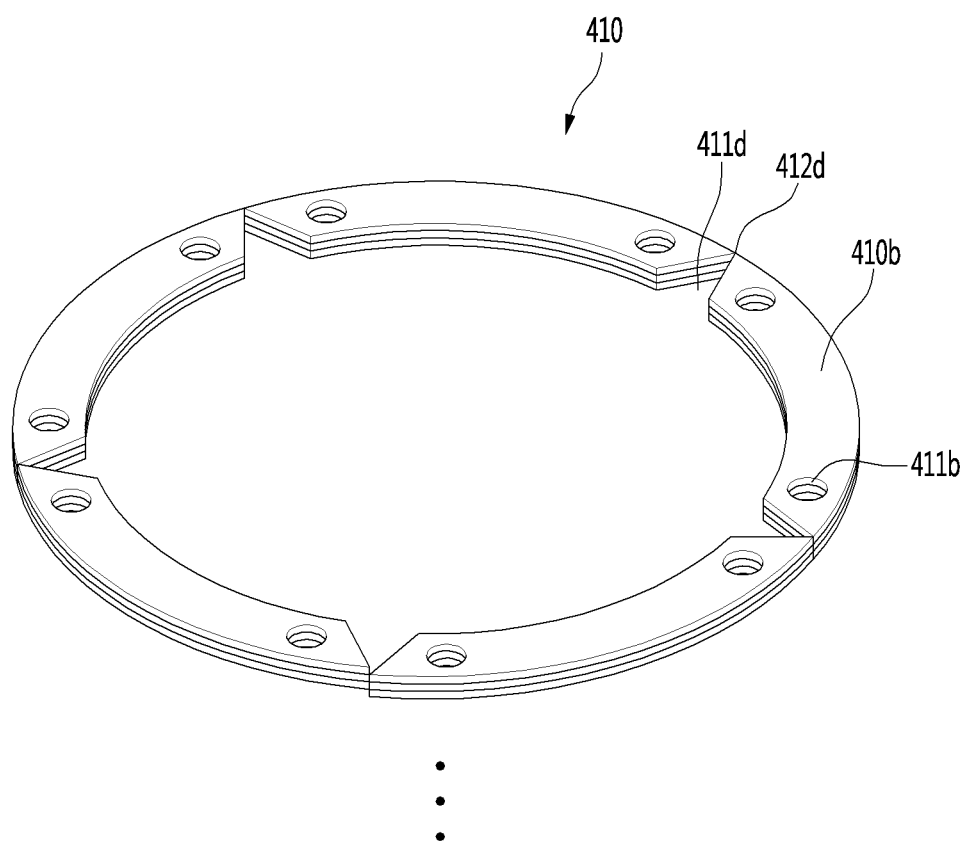
FIG. 30 is a perspective view illustrating a state in which the moving core that is one of the components surrounds the second segment band according to an embodiment.

FIG. 30 is a perspective view illustrating a state in which the moving core that is one of the components surrounds the second segment band according to an embodiment.

Referring again to FIG. 30, the moving core 410 may be manufactured by helically winding a second segment band 410*d*, in which the second segments 410*b*, each of which has the arc shape, are continuously connected to each other, around the connection member 420.

Here, the second segments 410*b* constituting the second segment band 410*d* may include connection parts 412*d* that come into point contact with each other and a cutoff part 411*d* between the second segments 410*b*.

As described above, when the second segment band 410*d* is helically wound around the connection member 420 to constitute the moving core 410, the second segment band 410*d* that is a length material may be easily manufactured through blanking, and also, the second seconds 410*b* may be stacked to a desired thickness through only a process of helically winding the second segments 410*b* around the connection member 420 to improve the workability.

In addition, the coupling force between the second segments 410*b* may also be secured to improve the structural stiffness of the moving core 410.

Figure 31:
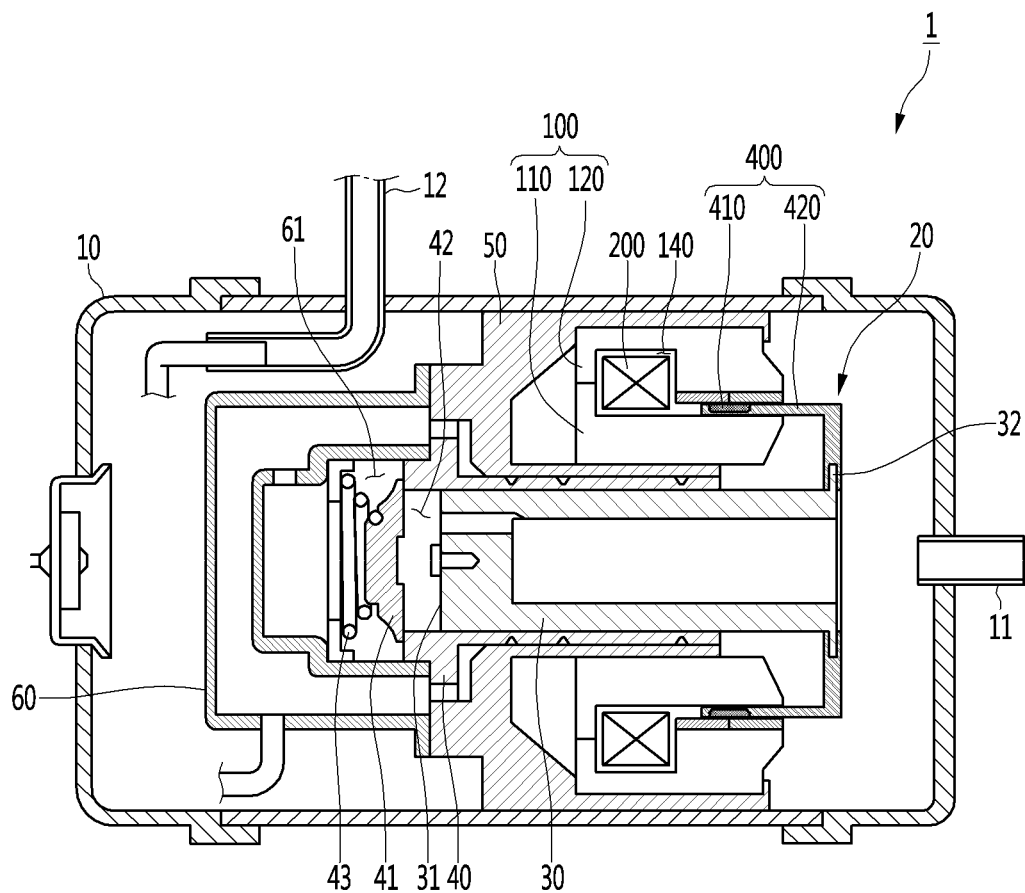
FIG. 31 is a longitudinal cross-sectional view of a reciprocating compressor including the moving core-type reciprocating motor according to an embodiment.

FIG. 31 is a longitudinal cross-sectional view of a reciprocating compressor including the moving core-type reciprocating motor according to an embodiment.

Referring to FIG. 31, a reciprocating compressor 1 according to this embodiment may include a case 10 having an inner space, a reciprocating motor 20 disposed in the inner space of the case 10 to allow the rotor 400 to reciprocate, a piston 30 coupled to the rotor 400 of the reciprocating motor 20 to reciprocate together with the rotor 400, a cylinder 40 into which the piston 30 is inserted to form a compression space 42, a suction valve 31 for opening and closing a suction side of the compression space 42, and a discharge valve 41 for opening and closing a discharge side of the compression space 42.

That is, a suction tube 11 may be connected to the inner space of the sealed case 10, and a discharge tube 12 for guiding a refrigerant compressed in the compression space 42 of the cylinder 40 to a refrigeration cycle may be connected to one side of the suction tube 11. Thus, the refrigerant suctioned into the inner space of the case 10 may be filled to increase a suction pressure, and the refrigerant discharged into the compression space 42 may be discharged to the outside of the case 10 toward a condenser through the discharge tube 12.

Also, a frame 50 may be installed in the inner space of the case 10, and the reciprocating motor 20 generating reciprocating force and inducing resonance motion of the piston 30 may be fixed and coupled to one surface of the frame 50.

The compression space 42 may be defined inside the reciprocating motor 20, and the cylinder 40 inserted into the frame 50 may be coupled. The piston 30 inserted to reciprocate within the cylinder 40 to vary in volume of the compression space 42 and thereby to compress the refrigerant may be coupled to the cylinder 40.

The suction valve 31 for opening and closing a suction passage of the piston 30 may be coupled to a front end surface of the piston 30, and the discharge valve 41 for opening and closing the compression space 42 of the cylinder 40 may be accommodated in a discharge cover 60 and then detachably coupled to the front end surface of the cylinder 40.

Also, a discharge space 61 may be defined in the discharge cover 60, and the discharge cover 60 may be fixedly coupled to the cylinder 40. The discharge valve 41 and a valve spring 43 supporting the discharge valve 41 may be accommodated in the discharge space 61 of the discharge cover 60, and an inlet of a gas bearing for lubrication between the cylinder 40 and the piston 30 may be accommodated in the discharge space 61.

The gas bearing (not shown) may include a gas communication path defined between an inner circumferential surface of the frame 50 and an outer circumferential surface of the cylinder 40 and a plurality of fine gas through-holes passing from a center of the gas communication path to an inner circumferential surface of the cylinder 40.

Here, since the reciprocating motor 20 includes the above-described constituents described with reference to FIGS. 1 to 30, their detailed descriptions will be derived from the above-described reciprocating motor.

However, in this embodiment, the inner stator 110 and the outer stator 120 may be fixed to the frame 50, and the rotor 400 may be connected to the piston 30. Thus, when the rotor 400 reciprocates with respect to the stator 100 and the magnet 300, the piston 30 inserted into the cylinder 40 may reciprocate together with the rotor 400 in both directions.

As described above, in the reciprocating compressor 1 according to this embodiment, when alternate current is applied to the reciprocating motor 20 and the magnet coil 200, an alternate flux may be generated between the stator 100, the magnet 300, and the rotor 400, and thus, the rotor 400 and the piston 30 connected to the rotor 400 may move in a direction in which the flux due to the magnet coil 200 and the flux due to the magnet 300 are magnetized to increase and thereby to continuously reciprocate.

Here, centering force that intends to return to a direction in which the magnetic energy is lower may be accumulated between the rotor 400, the stator 100, and the magnet 300 of the reciprocating motor.

In this state, when the current applied to the magnet coil 200 is changed in direction, the rotor 400 and the piston 30 connected to the rotor 400 may move in an opposite direction by the accumulated centering force and the magnetic force due to the fluxes of the magnet coil 200 and the magnet 300. Here, centering force that intends to return to a direction in which the magnetic energy is lower may be accumulated between the rotor 400, the stator 100, and the magnet 300 of the reciprocating motor.

Through this manner, like a case in which mechanical resonance spring is provided, the rotor 400 and the piston 30 may alternately move to left and right sides in the drawing to continuously repeat the reciprocating motion.

Here, while the rotor 400 reciprocates within the reciprocating motor, the magnetic resonance spring may be generated between the rotor 400, the stator 100, and the magnet 300 to induce the resonance motion of the rotor 400 and the piston 30.

Thus, the piston 30 may compress the refrigerant while overcoming the gas pressure generated in the compression space 42.

As described above, the reciprocating compressor according to this embodiment may have the effects due to the reciprocating motor of FIGS. 1 to 30. Thus, their description will refer to the above-described reciprocating motor.

The reciprocating compressor according to this embodiment may include the compact and lightweight reciprocating motor. Thus, the reciprocating compressor may also be compact and lightweight. Therefore, the compressor may be easily installed and maintained and repaired.

Also, the reciprocating compressor may include the reciprocating motor that is easily manufactured and has improved structural stiffness. Thus, the reciprocating compressor may also be easily manufactured and has improved structural stiffness.

Also, the rotor may be reduced in weight, and the magnetic gas between the rotor, the stator, and the magnet may be minimized so that the motor operates at the high speed to improve motor efficiency, and thus, the compressor may be improved in efficiency.

Figure 32:
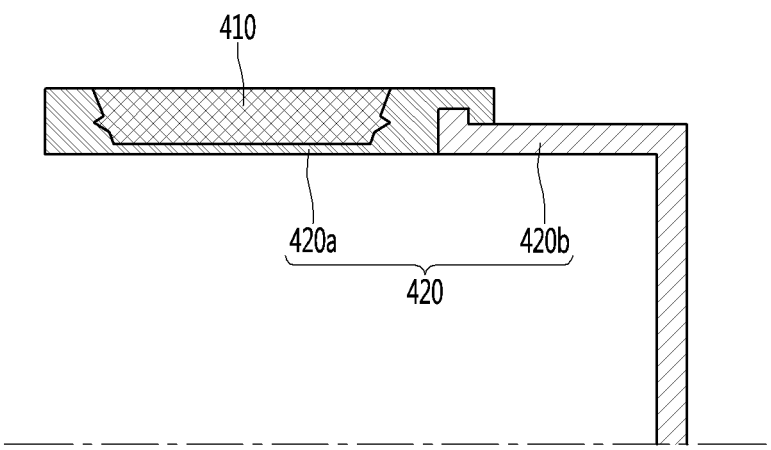
FIG. 32 is a cross-sectional view illustrating a rotor and a piston of a reciprocating compressor according to another embodiment.
Figure 33:
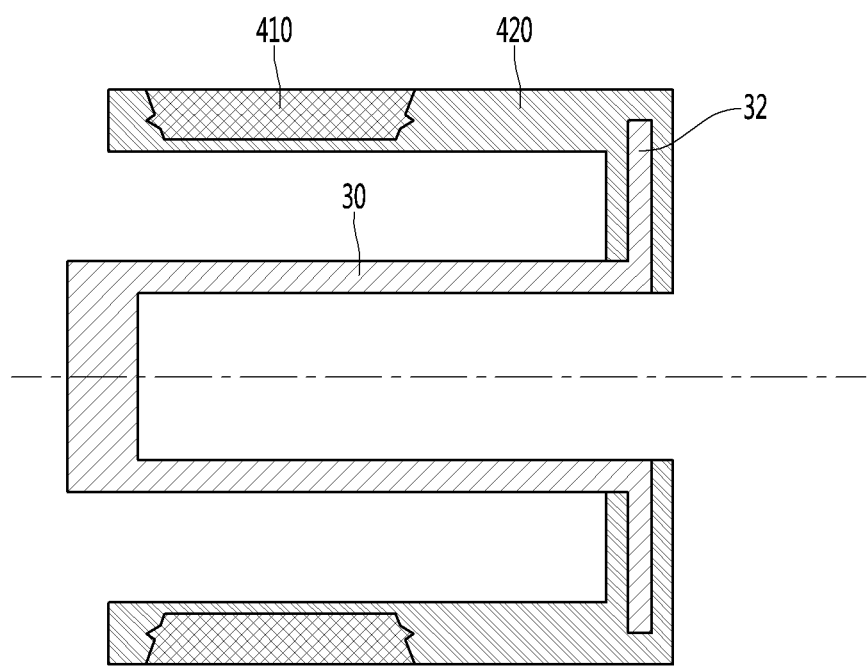
FIG. 33 is a cross-sectional view illustrating a rotor and a piston of a reciprocating compressor according to further another embodiment.

FIG. 32 is a cross-sectional view illustrating a rotor and a piston of a reciprocating compressor according to another embodiment, and FIG. 33 is a cross-sectional view illustrating a rotor and a piston of a reciprocating compressor according to further another embodiment.

Referring to FIG. 32, the connection member 420 may include a first connection member 420a connected to the moving core 410 and a second connection member 420b connecting the first connection member 420a to the piston 30.

As described above, when the connection member 420 is constituted by the first connection member 420a and the second connection member 420b, the piston 30 and the moving core 410 may be connected to integrated with each other through a process in which the first connection member 420a and the moving core 410 are connected to each other, the second connection member 420b and the piston 30 are connected to each other, and the first connection member 420a and the second connection member 420b are connected to each other.

Thus, the moving core 410 and the piston 30 may be more easily connected to each other when compared to a method in which the piston 30 is directly connected to the connection member 420 connected to the moving core 410.

In this embodiment, the first connection member 420a and the second connection member 420b may be made of materials different from each other.

For example, the first connection member 420a may be made of a glass fiber, and the second connection member 420b may be made of plastic or a material in which the plastic and the glass fiber are mixed with each other.

Since the glass fiber is a nonmagnetic and nonconductive material, when the connection member 420a is made of the glass fiber material, stiffness of the connection member 420 may be secured, and an eddy current loss of the rotor 400 may be reduced. Here, the glass fiber may be fixed to be integrated with the moving core 410 through heating and curing processes.

Also, when the second connection member 420 is made of the material including the plastic, the second connection member 420b and the piston 30 may be integrally injection-molded. When the second connection member is made of the material in which the plastic and the glass fiber are mixed with each other, the injection molding may be possible, and also, stiffness of the second connection member 420 may also be secured like the first connection member 420a.

Also, referring to FIG. 33, the connection member 420 and the piston 30 may be integrated with each other through insert-injection molding.

For example, the connection member 420 may be made of plastic or a mixture of the plastic and the glass fiber.

According to the related art, the magnet 300 may be provided in the rotor 400, and thus, it may be difficult to be integrally manufactured with the piston due to limitations of the magnetic force and magnetization.

On the other hand, according to the embodiments, since the magnet 300 is fixed to the stator 100, and only the moving core 410 is provided in the rotor 400, the piston 30 and the rotor 400 may be integrally injection-molded.

Here, in the piston 30, a flange 32 may be disposed on a rear end that is opposite to a front end on which the suction valve 31 is disposed. The flange 32 may be insert-injected to be buried in the connection member 420 so that the piston 30 and the rotor 400 are integrated with each other.

As described above, when the piston 30 and the rotor 400 are integrated with each other, the coupling force between the rotor 400 and the piston 30 may be secured, and thus, a process of connecting the rotor 400 to the piston 30 through a bolt may be omitted to improve the workability. Also, since the a part such as the bolt is omitted, a load applied to the rotor 400 and the piston 300 may be reduced to more improve the efficiency of the motor and reduce noises and vibration due to the omission of the assembly part.

Figure 34:
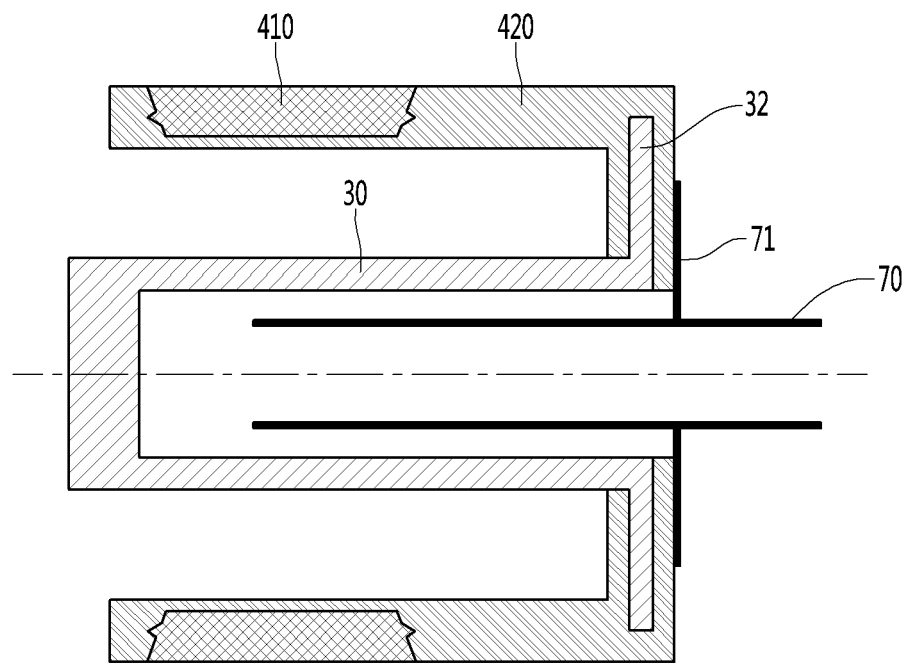
FIG. 34 is a cross-sectional view illustrating a rotor, a piston, and a muffler of a reciprocating compressor according to further another embodiment.

FIG. 34 is a cross-sectional view illustrating a rotor, a piston, and a muffler of a reciprocating compressor according to further another embodiment.

Referring to FIG. 34, a muffler 70 may be provided inside the piston 30, and the muffler 70 may be attached to the outer surface of the connection member 420 through a fusing or bonding manner using dielectric heating.

In general, the compressor 1 includes the muffler 70 connected to the piston 30 to reduce noises generated from the refrigerant suctioned through the suction tube 11. The refrigerant suctioned through the suction tube 11 flows into the piston 30 via the muffler 70. For example, while the refrigerant passes through the muffler 70, the flow noise of the refrigerant may be reduced.

As described above, when the muffler 70 is attached to the connection member 420, a load applied to the rotor 400 may be reduced due to the omission of the part such as the bolt to more improve the efficiency of the motor and reduce noises and vibration due to the omission of the assembly part.

Here, a flange 71 may be disposed on a rear end of the muffler 70, and also, the flange 71 may be attached to the outer surface of the connection member 420.

For another example, the muffler 70 as well as the piston 30 may also be integrated with the rotor 400 through the insert injection so that the flange 71 disposed on the rear end of the muffler 70 is buried in the connection member 420.

As described above, when the muffler 70, the piston 30, and the rotor 400 are integrated with each other, the coupling force between the rotor 400 and the piston 30 may be secured, and thus, a process of connecting the rotor 400 to the piston 70 through a bolt may be omitted to improve the workability. Also, since the muffler 70, the piston 30, and the rotor 400 are integrated with each other, tolerance management may be advantageous. Also, the uniform gas may be enabled through the advantageous tolerance management, and the eccentric force applied to the rotor 400, the stator 100, and the magnet 300 may be minimized. Thus, the rotor 400 may linearly reciprocate without rotating.

According to the embodiments, the rotor may be resonant by the magnetic resonance spring to previously prevent the phenomenon in which the use frequency is limited within the driving frequency in the certain section from occurring, thereby improving the efficiency of the motor.

According to the embodiments, the rotor may be resonant by the magnetic resonance spring to reduce the number of parts for the resonance of the rotor, thereby more reducing the transverse length of the motor.

According to the embodiments, the rotor may be resonant by the magnetic resonance spring to prevent the rotor from eccentrically moving by the lateral force of the resonance spring, thereby reducing the friction loss and the noises.

According to the embodiments, the magnet may be coupled to the end of the stator to reduce the weight of the rotor, and thus, the power consumption may be reduced to improve the efficiency of the motor and increase in driving frequency so that the motor is driven at the high speed.

According to the embodiments, the moving core may be exposed to the gap to more reduce the magnetic gap between the magnet, the stator, and the moving core.

According to the embodiments, the stator and the rotor may be easily manufactured to reduce the manufacturing costs.

According to the embodiment, the reciprocating motor may be provided to realize the compact and lightweight reciprocating compressor.

According to the embodiment, the compressor may be improved in efficiency and reduced in noise.

According to the embodiments, the rotor, the piston, and the muffler may be integrated with each other to improve the workability and the coupling force, easily manage the tolerance, and uniformize the gap, thereby minimally maintaining the eccentric force applied to the rotor.

Furthermore, various effects may be obtained that may be understood by the respective constitutions shown in the specific embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Embodiments provide a reciprocating motor in which all resonant frequencies within a driving frequency are capable of being used.

Embodiments also provide a reciprocating motor that is capable of being minimized in size in an axial direction and a radius direction.

Embodiments also provide a reciprocating motor in which a rotor is reduced in weight to reduce power consumption and thereby to improve motor efficiency and also to increase in driving frequency thereby to allow the motor to be driven at a high speed.

Embodiments also provide a reciprocating motor that increases in only size of a magnet while maintaining a size of a rotor to improve a motor output.

Embodiments also provide a reciprocating motor in which a rotor decreases in length to minimally maintain a magnetic gap due to a tolerance.

Embodiments also provide a reciprocating motor in which a moving core is exposed to a gap to more reduce a magnetic gap between a magnet, a stator, and the moving core.

Embodiments also provide a reciprocating motor that is capable of maximizing motor spring stiffness due to a reduced magnetic gap.

Embodiments also provide a reciprocating motor that is capable of preventing a moving core from being separated when a rotor reciprocates even though a separate coating layer for fixing the moving core is not provided.

Embodiments also provide a reciprocating motor in which a stator and a rotor are easily manufactured to reduce manufacturing costs.

Embodiments also provide a compact and lightweight reciprocating motor by reducing a size thereof.

Embodiments also provide a reciprocating motor in which a rotor, a piston, and a muffler thereof are integrated with each other to improve workability and coupling force, easily manage a tolerance, and uniformize a gap and thereby to minimally maintain eccentric force applied to the rotor.

In one embodiment, a moving core-type reciprocating motor includes: a stator including an inner stator and an outer stator having one side connected to one side of the inner stator and the other side spaced apart from the other side of the inner stator in a radius direction to define a gap together with the other side of the inner stator; a magnet coil wound between the inner stator and the outer stator; a magnet fixed to at least one of the inner stator and the outer stator so as to be exposed to the gap; a rotor including a moving core disposed in the gas and made of a magnetic material to reciprocate with respect to the stator and the magnet and a hollow connection member made of a non-magnetic material and supporting the moving core so that the moving core is exposed to the gap toward the magnet. Thus, the rotor may be reduced in weight to reduce the power consumption, thereby improving efficiency of the motor, and the moving core may be exposed to the gap to minimally maintain the magnetic gap between the moving core, the magnet, and the stator.

The connection member may have a buried groove, which is recessed inward, in the inner or outer circumferential surface thereof, and at least a portion of the moving core may be buried in the buried groove. Thus, the coupling force between the moving core and the connection member may be improved to prevent the moving core from being separated from the connection member while the rotor reciprocates, and the rotor may be reduced in thickness to reduce the gap and improve the magnetic spring stiffness of the rotor.

The moving core may pass through the connection member and is fixed to be exposed to the inside and outside of the connection member. Thus, the gap may be reduced by the omitted thickness of the connection member, and the magnetic spring stiffness of the rotor may be more improved in proportion to the reduced size of the gap.

An exposed surface of the moving core, which is exposed to the inside or outside of the connection member, may be disposed in a straight line with an inner or outer circumferential surface of the connection member. Thus, while the rotor reciprocates, the moving core may be prevented from colliding with the stator or the magnet.

The moving core and the connection member may be integrated with each other through insert-injection. Thus, the process of fixing the moving core to the connection member may be omitted to improve the workability, and the coupling force between the moving core and the connection member may be improved, and thus, the tolerance management may be advantageous.

The connection member may be made of a material comprising a glass fiber. Thus, the stiffness of the connection member may be secured, and the eddy current of the rotor may be reduced.

The moving core may be manufactured by radially stacking first segments, which are disposed in parallel to the reciprocating direction of the moving core, in a circumferential direction of the connection member. Thus, the eddy current may be reduced.

The first segment may include a fixed protrusion that provides to the inside of the connection member on at least one side surface thereof coming into contact with the connection member. Thus, the coupling force between the first segment and the connection member may increase to stably maintain the fixed state without separating the first segment from the connection member.

At least one hole may be punched in the first segment. Thus, the first segment may be reduced in weight to reduce the total weight of the rotor.

An exposed surface of the first segment, which is exposed to the inside or outside of the connection member, may have a length less than that of a contact surface of the first segment, which comes into contact with the connection member. Thus, although the separate fixing protrusion or fixing hole are not provided in the first segment, the coupling force between the first segment and the connection member may increase to stably maintain the fixed state without separating the first segment from the connection member.

The first segment may include a protrusion part protruding in parallel to the stacking direction and a groove part that is recessed. Thus, when the plurality of first segments are stacked, the first segments may be stacked while the protrusion part is inserted into the groove part to easily perform the stacking process, and the coupling force between the plurality of first segments may be secured to firmly maintain the stacked state without disturbing the stacked shape.

The moving core may be manufactured by stacking second segments, which are disposed in parallel to the circumferential direction of the connection member, in the reciprocating direction of the moving core, and at least one connection hole may be punched in each of the second segments, and a connection protrusion that is parallel to the stacking direction of the second segments may be disposed on the connection member so that the connection protrusion is inserted into the connection hole to stack the second segments. Thus, the second segment may be reduced in weight to reduce the total weight of the rotor, and the second segments may be more easily stacked, and also, the coupling force between the second segment and the connection member may be improved.

The second segment may include a protrusion part protruding in parallel to the stacking direction and a groove part that is recessed. Thus, when the plurality of first segments are stacked, the first segments may be stacked while the protrusion part is inserted into the groove part to easily perform the stacking process.

The moving core may be manufactured by second segment rings, in which the second segments, each of which has an arc shape, are continuously connected to form a circular shape, in the reciprocating direction of the moving core. Thus, the second segments may be stacked once in the circumferential direction to improve the workability, and the coupling force between the second segments may also be secured to improve the structural stiffness of the moving core.

The moving core may be manufactured by helically winding a second segment band, in which the second segments, each of which has an arc shape, are continuously connected to each other, around the connection member. Thus, the second segment band that is the length material may be easily manufactured through the blanking, and the second seconds may be stacked to a desired thickness through only a process of helically winding the second segments around the connection member to improve the workability.

In another embodiment, a reciprocating compressor includes: a case having an inner space; a reciprocating motor disposed in the inner space of the case to allow a rotor to reciprocate; a piston coupled to the rotor of the reciprocating motor to reciprocate together with the rotor; a cylinder into which the piston is inserted to define a compression space; a suction valve for opening and closing a suction side of the compression space; and a discharge valve for opening and closing a discharge side of the compression space, wherein the reciprocating motor comprises the abovementioned moving core-type reciprocating motor. Thus, the reciprocating motor may be provided to realize the compact and lightweight reciprocating compressor.

The connection member and the piston may be integrated with each other through insert-injection. Thus, since the coupling force between the rotor and the piston is secured, and the process of connecting the rotor to the piston through the bolt is omitted, the workability may be improved, and the load applied to the rotor may be reduced due to the omission of the part such as the bolt to more improve the efficiency of the motor and reduce noises and vibration due to the omission of the assembly part.

A muffler may be disposed inside the piston, and the muffler may be attached to an outer circumferential surface of the connection member through a fusion or bonding manner using dielectric heating. Thus, since the coupling force between the rotor, the piston, and the muffler is more secured, and the process of connecting the rotor to the muffler through the bolt is omitted, the workability may be improved, and since the muffler and the rotor are integrated with each other, the tolerance management may be advantageous. Also, the uniform gas may be enabled through the advantageous tolerance management, and the eccentric force applied to the rotor, the stator, and the magnet may be minimized. Thus, the rotor may linearly reciprocate without rotating.

The details of one or more embodiments are set forth in the accompanying drawings and the description below. Other features will be apparent from the description and drawings, and from the claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A moving core-type reciprocating motor comprising:
a stator including an inner stator and an outer stator, the outer stator having a first side connected to one side of the inner stator and a second side spaced apart from the other side of the inner stator in a radius direction to form a gap between the outer stator and the inner stator;
a magnet coil wound between the inner stator and the outer stator;
a magnet to attach to at least one of the inner stator and the outer stator, and the magnet to be provided at the gap;
a rotor including a moving core and a hollow connection member, the moving core disposed at the gap to reciprocate with respect to the stator and the magnet, the moving core made of a magnetic material, the hollow connection member made of a nonmagnetic material, and the hollow connection member to support the moving core such that the moving core is exposed to the gap and to the magnet, and
wherein the moving core is coupled to an inner circumferential surface of the hollow connection member so as to be exposed to an inside of the hollow connection member, or the moving core is coupled to an outer circumferential surface of the hollow connection member so as to be exposed to an outside of the hollow connection member, and
wherein the moving core is provided by radially stacking first segments, along a circumference of the hollow connection member, wherein the first segments are disposed in parallel to a reciprocating direction of the moving core, and
wherein the first segment includes a fixed protrusion that protrudes to the inside of the hollow connection member on at least one side surface of the first segment that contacts the hollow connection member, and
wherein an exposed surface of the first segment is exposed to the inside or outside of the hollow connection member, wherein a contact surface of the first segment is a surface of the first segment that contacts the hollow connection member, and a length of the exposed surface of the first segment is less than a length of the contact surface of the first segment.

2. The moving core-type reciprocating motor according to claim 1, wherein each of the inner stator and the outer stator is provided by radially stacking an inner core block and an outer core block, wherein one side of the inner core block is coupled to one side of the outer core block, and the other sides of the inner core block and the outer core block are spaced apart from each other to define the gap.

3. The moving core-type reciprocating motor according to claim 1, wherein the hollow connection member includes a buried groove at the inner or outer circumferential surface of the hollow connection member, and
at least a portion of the moving core is provided in the buried groove.

4. The moving core-type reciprocating motor according to claim 1, wherein the moving core includes a plurality of moving cores, and the plurality of moving cores are spaced apart from each other along the circumference of the hollow connection member.

5. The moving core-type reciprocating motor according to claim 1, wherein the moving core passes through the hollow connection member and is exposed to the inside of the hollow connection member and to the outside of the hollow connection member.

6. The moving core-type reciprocating motor according to claim 1, wherein an exposed surface of the moving core is exposed to the inside or the outside of the hollow connection member, and the exposed surface of the moving core is disposed in a straight line with the inner or outer circumferential surface of the hollow connection member.

7. The moving core-type reciprocating motor according to claim 1, wherein the moving core is integrated with the hollow connection member by insert-injection.

8. The moving core-type reciprocating motor according to claim 1, wherein the hollow connection member is made of at least a glass fiber.

9. The moving core-type reciprocating motor according to claim 1, wherein the first segment includes at least one hole.

10. The moving core-type reciprocating motor according to claim 1, wherein the first segment includes the protrusion and a groove, wherein the protrusion protrudes from the first segment in parallel to a stacking direction of the first segments, and the groove is recessed in the first segment.

11. The moving core-type reciprocating motor according to claim 1, wherein an adhesive is provided at an exposed surface of the moving core, which is exposed to the inside or outside of the hollow connection member, to couple the plurality of stacked first segments to each other.

12. The moving core-type reciprocating motor according to claim 1, wherein an exposed surface of the moving core, which is exposed to the inside or outside of the hollow connection member, is welded to couple the plurality of stacked first segments to each other.

13. A reciprocating compressor comprising:
a case having an inner space;
the moving core-type reciprocating motor according to claim 1 disposed in the inner space of the case to allow the rotor to reciprocate;
a piston coupled to the rotor of the moving core-type reciprocating motor to reciprocate with the rotor;
a cylinder to receive the piston and to define a compression space;
a suction valve to open and close a suction side of the compression space; and
a discharge valve to open and close a discharge side of the compression space.

14. The reciprocating compressor according to claim 13, wherein the connection member includes:
a first connection member coupled to the moving core; and
a second connection member coupling the first connection member to the piston.

15. The reciprocating compressor according to claim 13, wherein the hollow connection member is integrated with the piston by insert-injection.

16. The reciprocating compressor according to claim 13, wherein a muffler is disposed inside the piston, and the muffler is attached to the outer circumferential surface of the hollow connection member through a fusion or bonding manner by using dielectric heating.

17. The moving core-type reciprocating motor according to claim 1, wherein the moving core is provided by stacking other segments, which are in the reciprocating direction of the moving core, and the other segments are disposed in parallel to the circumference of the hollow connection member.

18. The moving core-type reciprocating motor according to claim 17, wherein each of the other segments includes at least one connection hole and a connection protrusion parallel to a stacking direction of the other segments, wherein the connection protrusion is disposed on the hollow connection member such that the connection protrusion is provided in the connection hole to stack the other segments.

19. The moving core-type reciprocating motor according to claim 17, wherein the other segment includes a protrusion and a groove, wherein the protrusion protrudes from the other segment in parallel to a stacking direction of the other segments, and the groove is recessed in the other segment.

20. The moving core-type reciprocating motor according to claim 17, wherein each of the other segments has an arc shape.

21. The moving core-type reciprocating motor according to claim 20, wherein the moving core is provided by segment rings, in which the other segments are continuously connected to form the circular shape, in the reciprocating direction of the moving core.

22. The moving core-type reciprocating motor according to claim 20, wherein the moving core is provided by helically winding a segment band in which the other segments are continuously connected to each other, around the hollow connection member.

* * * * *